US011244459B2

(12) United States Patent
Sato et al.

(10) Patent No.: US 11,244,459 B2
(45) Date of Patent: Feb. 8, 2022

(54) METHOD FOR SEGMENTATION OF GRAYSCALE IMAGES AND SEGMENTED AREA TRACKING

(71) Applicants: Masahiko Sato, Saint-Augustin-de-Desmaures (CA); Sachiko Sato, Saint-Augustin-de-Desmaures (CA); Ann Rancourt, Quebec (CA)

(72) Inventors: Masahiko Sato, Saint-Augustin-de-Desmaures (CA); Sachiko Sato, Saint-Augustin-de-Desmaures (CA); Ann Rancourt, Quebec (CA)

(*) Notice: Subject to any disclaimer, the term of this patent is extended or adjusted under 35 U.S.C. 154(b) by 95 days.

(21) Appl. No.: 16/714,104

(22) Filed: Dec. 13, 2019

(65) Prior Publication Data

US 2020/0193608 A1   Jun. 18, 2020

Related U.S. Application Data

(60) Provisional application No. 62/780,321, filed on Dec. 16, 2018.

(51) Int. Cl.
| | |
|---|---|
| *G06T 7/13* | (2017.01) |
| *G06T 7/181* | (2017.01) |
| *G06T 3/40* | (2006.01) |
| *G06K 9/00* | (2006.01) |
| *G06T 7/12* | (2017.01) |
| *G06T 7/246* | (2017.01) |
| *G06T 7/11* | (2017.01) |
| *G06T 7/187* | (2017.01) |

(52) U.S. Cl.
CPC ............ *G06T 7/13* (2017.01); *G06K 9/00718* (2013.01); *G06K 9/00744* (2013.01); *G06T 3/4038* (2013.01); *G06T 7/11* (2017.01); *G06T 7/12* (2017.01); *G06T 7/181* (2017.01); *G06T 7/187* (2017.01); *G06T 7/246* (2017.01); *G06K 2009/00738* (2013.01)

(58) Field of Classification Search
CPC ......... G06T 7/13; G06T 7/181; G06T 3/4038; G06T 7/12; G06T 7/246; G06T 2207/10016; G06T 7/11; G06T 7/187; G06K 9/00744; G06K 9/00718; G06K 2009/00738; G06K 9/00147; G06K 9/0014

See application file for complete search history.

(56) References Cited

U.S. PATENT DOCUMENTS

| | | | | |
|---|---|---|---|---|
| 2005/0110802 A1* | 5/2005 | Avinash | ................... | G06T 5/50 345/629 |
| 2010/0150443 A1* | 6/2010 | Zahniser | .............. | G06K 9/0014 382/173 |
| 2015/0297949 A1* | 10/2015 | Aman | .................... | G06T 7/246 348/157 |

\* cited by examiner

*Primary Examiner* — Zhitong Chen
(74) *Attorney, Agent, or Firm* — K&L Gates LLP

(57) ABSTRACT

The present invention is directed to a method for segmentation and tracking of objects recorded in a grayscale video stream and three-dimensional image slices obtained from various devices, including microscopes, video cameras, medical apparatus, and remote sensing devices, using an approach to correct background, segment images using an improved approach, track a segmented area by evaluating surrounding information of the area, analyze data, and create archives of video streams or three-dimensional image slices, segmented areas and the results of tracking.

16 Claims, 17 Drawing Sheets

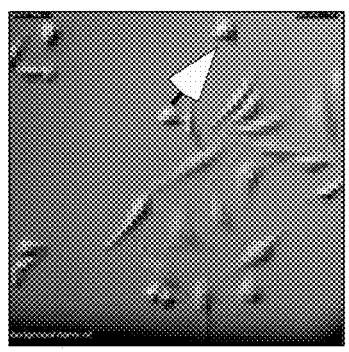 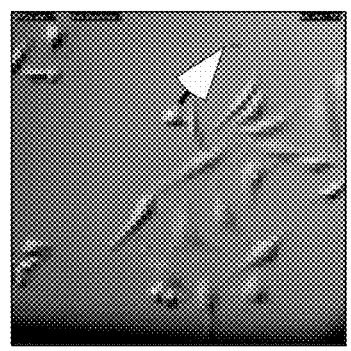 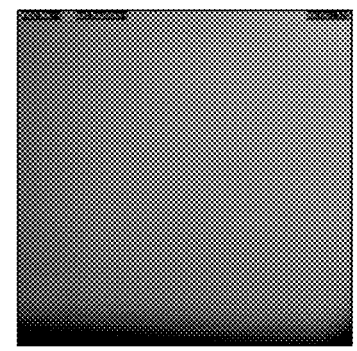
FIG. 7A  FIG. 7B  FIG. 7C
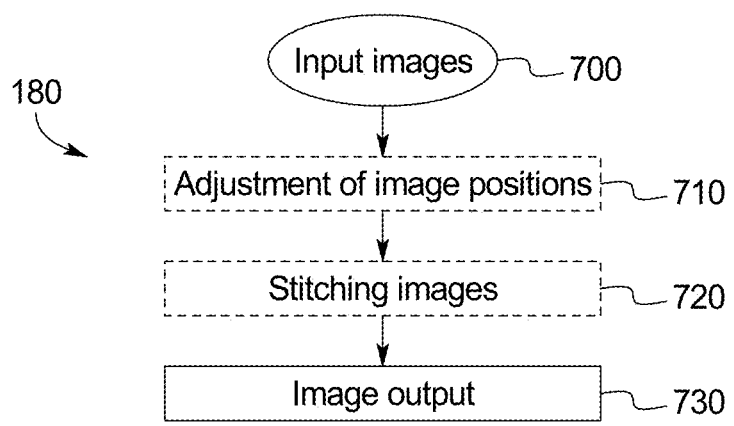
FIG. 8
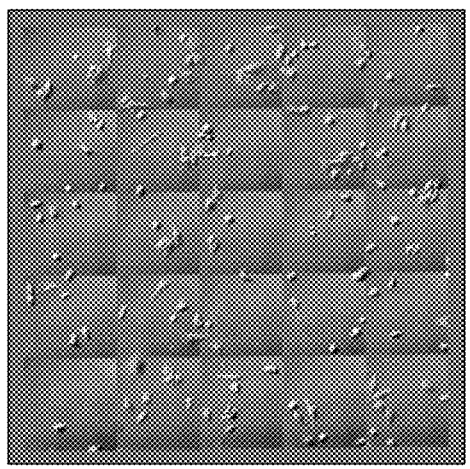 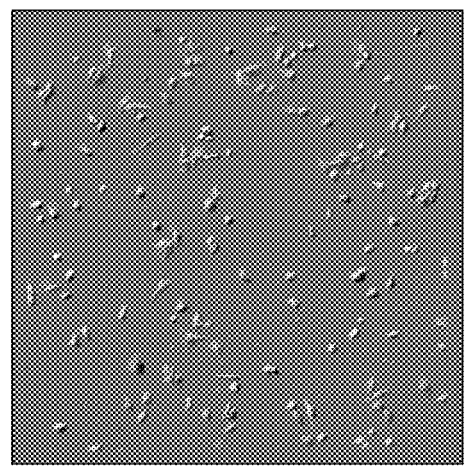
FIG. 9A  FIG. 9B

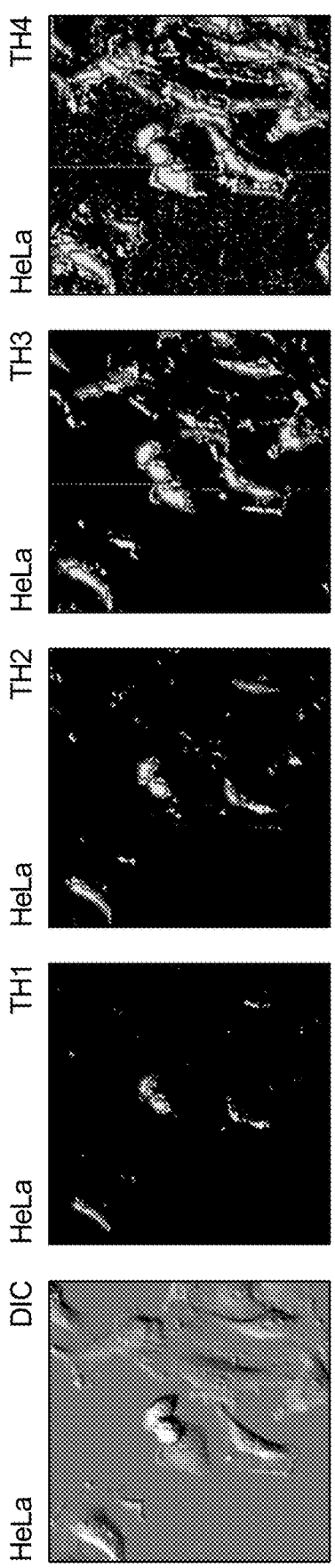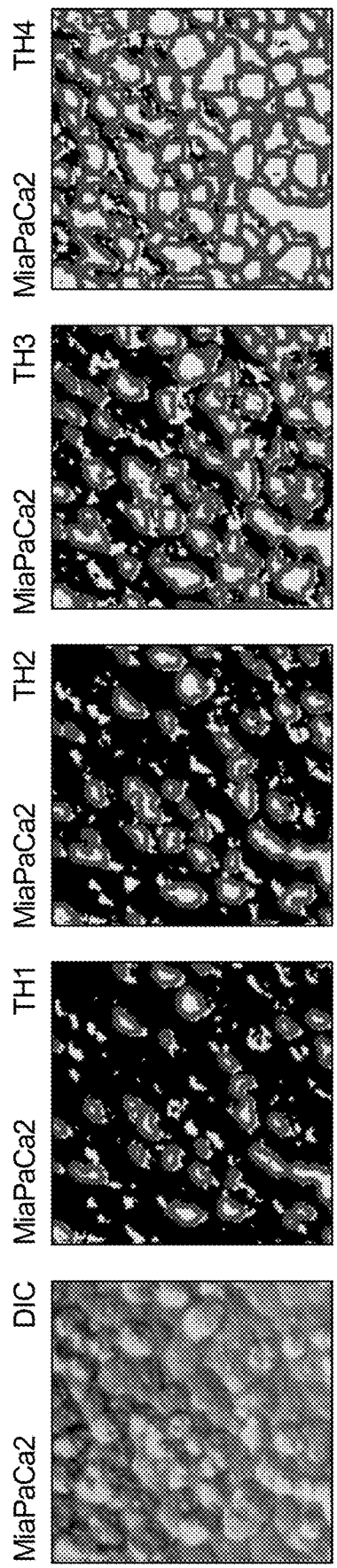

FIG. 12A
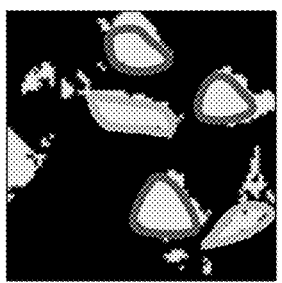
FIG. 12B
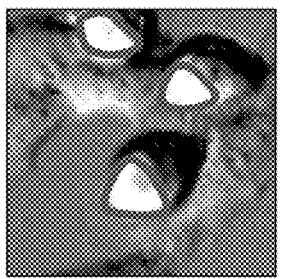
FIG. 12C
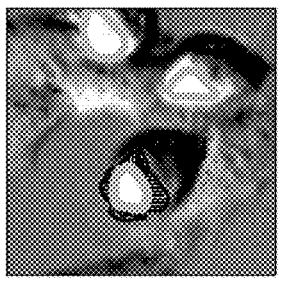
FIG. 12D
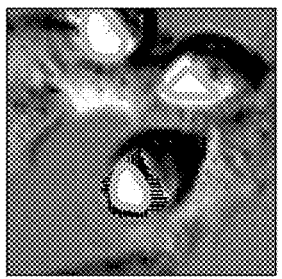
FIG. 12E
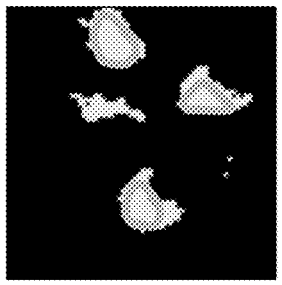
FIG. 12F
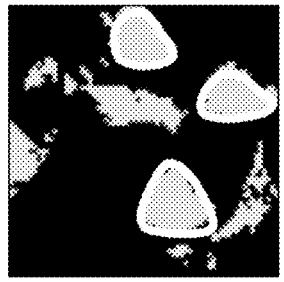
FIG. 12G
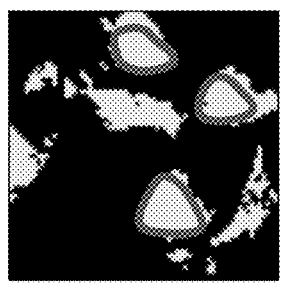
FIG. 12H
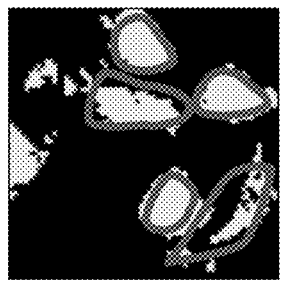
FIG. 12I
FIG. 12J
FIG. 12K
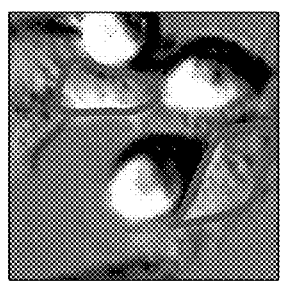
FIG. 12L
FIG. 12M
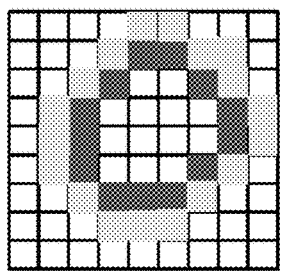
FIG. 12N
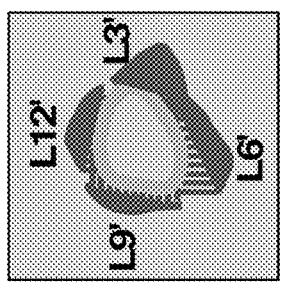
FIG. 12O
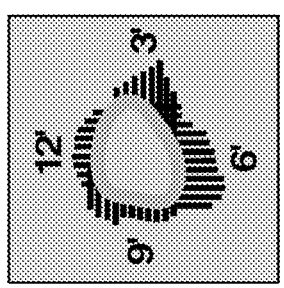

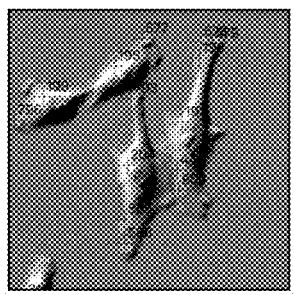 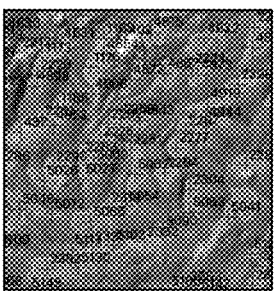 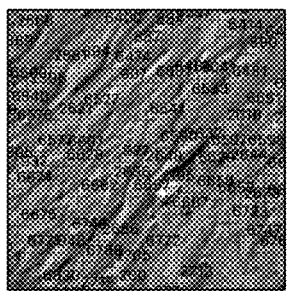 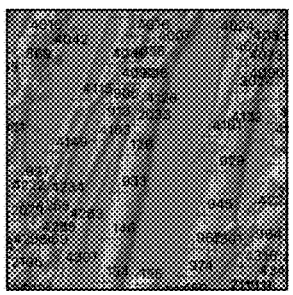
FIG. 13A  FIG. 13B  FIG. 13C  FIG. 13D
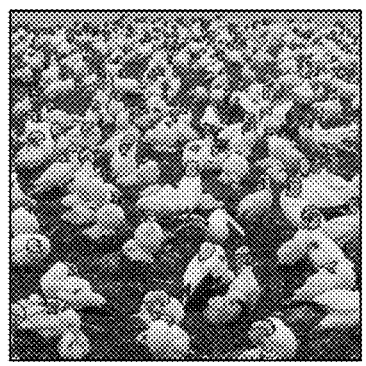 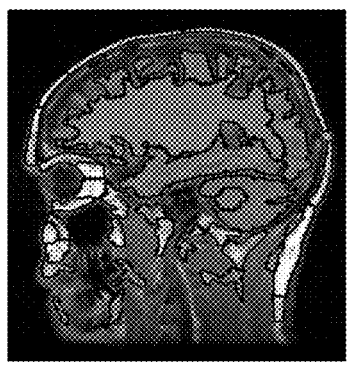 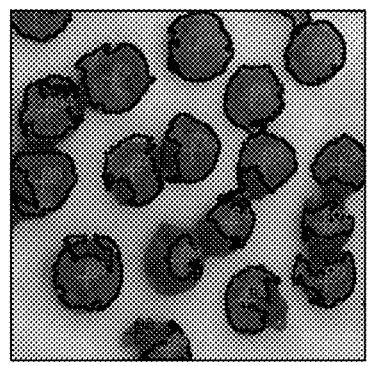
FIG. 13E  FIG. 13F  FIG. 13G
FIG. 13H
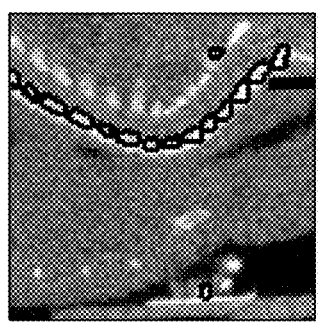 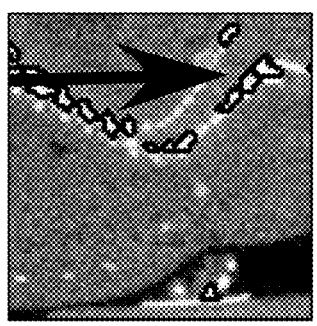
FIG. 13I  FIG. 13J

| Time A | Time A+1 | | |
|---|---|---|---|
| Object segmentation and identification | Time A+1 segmentation and overlaying Time A target segment | Overlaying Time A neighboring segments | Determination of new area |

FIG. 17A FIG. 17D FIG. 17G FIG. 17I

Tracking cell

FIG. 17B FIG. 17E FIG. 17H

Tracking segment

Multiple small segments

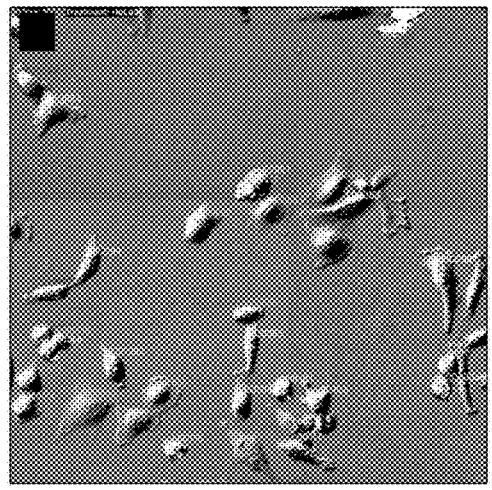
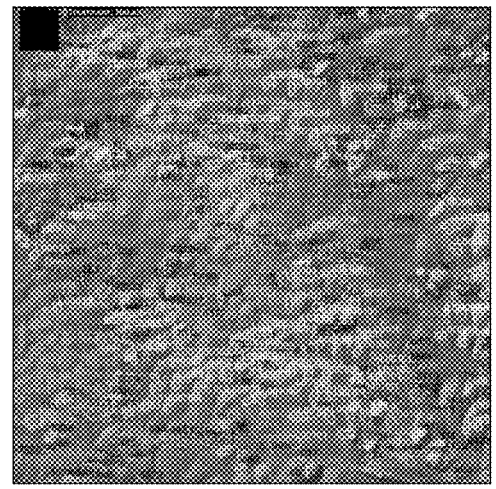
FIG. 20A             FIG. 20B
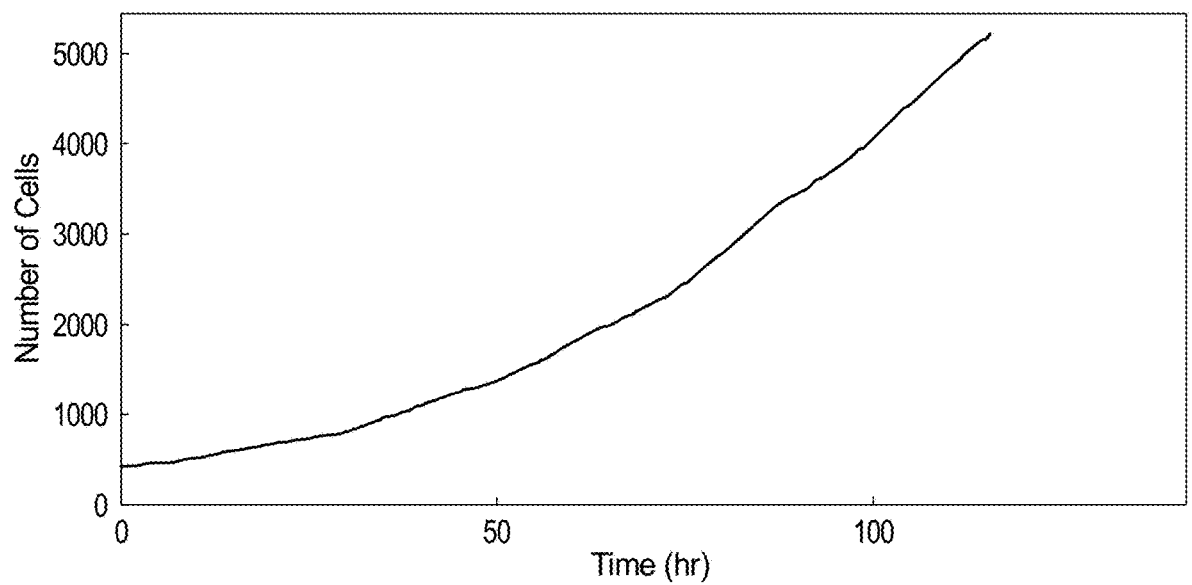
FIG. 21

METHOD FOR SEGMENTATION OF GRAYSCALE IMAGES AND SEGMENTED AREA TRACKING

CROSS-REFERENCE TO RELATED APPLICATIONS

This application incorporates by reference and claims the benefit of priority to U.S. Provisional Application 62/780,321 filed on Dec. 16, 2018.

BACKGROUND OF THE INVENTION

The present invention is directed to a method for segmentation and tracking of objects recorded in a grayscale video stream and three-dimensional image slices (cross-section images) obtained from various devices, including microscopes, video cameras, medical apparatus, and remote sensing devices, using an approach to correct background, segment images using an improved approach, track a segmented area by evaluating surrounding information of the area, analyze data, and create archives of video streams or three-dimensional image slices, segmented areas and the results of tracking.

Video streams and three-dimensional image slices created by various apparatus, including video cameras, microscopes, medical apparatus, and remote sensing devices, contain information that allows defining the characteristics of individual objects recorded in the video streams and the slices. For example, a video stream created by long-term differential interference contrast (DIC) imaging of live cells allows defining the fate of individual cells and characteristics of a cell population, detecting rare cellular events occurred within a cell population, precisely investigating a spatiotemporal relationship of progeny cells with their siblings and progenitors, and accurately analyzing the response of cells to substances.

An extraction of information from video streams and three-dimensional image slices can generally be performed by a method including fetching individual images of a video stream or of slices, converting the images into an appropriate format, segmenting images, tracking segmented areas across the video streams or slices, relating the tracking data with object of interests, archiving the results of the tracking, and analyzing the results. Among the steps, image segmentation is one of the critical steps that have an impact on the accuracy of the method. For example, images of live cells created by a DIC-microscopy are often difficult to be accurately segmented by existing segmentation methods, e.g. feature-space shareholding or clustering, region growing or extension, and gradient-based approaches. As DIC images created by microscopes and images generated by magnetic resonance (MRI), positron tomography scan, supersonic echo, X-ray radiography, and remote sensing, are often grayscale images, segmentation of the images has to be performed using a less amount of information compared with color images, resulting in a poor image segmentation.

Data generated by segmentation have a two-dimensional space, of which shape may change between images. Thus, a method to track an object using segmented areas requires having a function to find segmented areas corresponding to the one that had been tracked regardless of the alteration of segmentation patterns and the shape. Thus, in the most of tracking methods, e.g. particle tracking, a unique characteristic that is found in an image and represents an object of interests is used to perform to object tracking to reduce the complexity associated with the tracking of areas. For example, a bright or a dark spot that corresponds to a cell is followed to track cells using particle tracking method. This method, however, has a limitation if an object of interest is not being represented by a single unique characteristic. For example, if an image of a cell is taken by using high magnification objective lens, various bright and dark spots may be seen in a cell, making difficult to track a cell by tracking these characteristics.

Grayscale video streams and three-dimensional slices, which are generated by various apparatus, such as microscopes, medical apparatus, and remote sensing devices, are often composed of grayscale images, which contain various critical information to characterize objects recorded in the images.

Accordingly, there is a need in the art to segment grayscale images generated by the apparatus and track a segmented area that corresponds to an object across images comprising video stream or the slices to extract information that may be used for cell biological study, medical diagnosis, material science, environmental research and other areas that required to analyze grayscale images. Additionally, there is also a need of a system to perform a segmentation of grayscale images that is optimal for tracking and to track segmented areas in coordination with video stream creation, data analysis, and archiving of video streams, segmented data, and the results of segmented area tracking.

BRIEF SUMMARY OF THE INVENTION

Various examples of the systems and methods are provided herein.

In an example, the system for segmentation of a gray scale video stream, can include a controller; a memory coupled to the controller, wherein the memory is configured to store program instructions executable by the controller; wherein in response to executing the program instructions, the controller is configured to: receive an original image from a video stream, wherein the original image is associated with a predefined first threshold pixel value and a predefined second threshold pixel value; extract a first set of pixels that are higher than a predefined first threshold pixel value from the original image to generate a first threshold image; perform a first connectivity analysis based on the first set of extracted pixels, wherein the connectivity analysis includes identifying a first segmented area and a first set of edge pixels surrounding the first segmented area; extract a second set of pixels that are higher than a predefined second threshold pixel value from the original image, wherein the second threshold pixel value is less than the first threshold pixel value; overlay a first set of edge pixels surrounding the first connected area to the second threshold image; perform a second connectivity analysis based on the second set of extracted pixels except the areas that are overlaid with a first set of edge pixels surrounding the first connected area, wherein the connectivity analysis includes identifying a second connected area and a set of edge pixels surrounding the second connected area; expand areas that are overlaid with a first set of edge pixels surrounding the first connected area, wherein the area expansion includes a set of edge pixels surrounding the expanded area; remove overlapped areas of the set of edge pixels surrounding the second connected area and the set of edge pixels surrounding the expanded area, wherein the removal includes identifying a second segmented area and a second set of edge pixels surrounding the second connected area; repeat the same steps for the second image for plurality of images, wherein the final segmentation areas can be determined after the processing of plurality of images and at least two images are used; perform the image segmentation of images comprising the video stream or three-dimensional image slices, track segmented areas (target segmented area) throughout the video stream or three-dimensional image slices by merging or dividing segmented areas; determine a specific event that occurred in the target segmented area; built a database, wherein the database include information related to segments that are subject to the tracking; and perform analysis using the database.

In an example, the system for segmentation of a gray scale video stream and/or three-dimensional image slices can include a controller; a memory coupled to the controller, wherein the memory is configured to store program instructions executable by the controller; wherein in response to executing the program instructions, the controller is configured to apply a segmented area that is being tracked (target segmented area) to following images; apply other segmented area to the following images, identify segmented area that overlaps with a target segmented area; identify segmented area that also overlaps with other segmented areas; perform divisions of overlapped segmented areas or merging overlapped segmented areas of the following images; and determine target segmented area of following images that correspond to the target segmented area.

In an example, the system for segmentation of a gray scale video stream and/or three-dimensional image slices, can include a controller; a memory coupled to the controller, wherein the memory is configured to store program instructions executable by the controller; wherein in response to executing the program instructions, the controller is configured to create images by applying a series of thresholds; perform a connectivity analysis using the image created by the highest threshold; expand a connected area using an original image as a guidance to determine a boundary of an object; apply expanded areas to the image created by the next highest threshold; perform connectivity analysis using the image created by the next highest threshold except the areas that overlap with the expanded areas; expand new connected area using an original image as a guidance to determine a boundary of an object and expanding previously expanded area using the image created by the next highest threshold; adjust the shape of areas; and determine segmented areas.

Segmentation of grayscale image is challenging when there is not a significant difference between the grayscale values of a first object and a second object, or when the low grayscale value of an object is located adjacent to a high grayscale value of an object. By thresholding images and determining edge pixels surrounding the connected area of pixels using the images, the present methods and systems provide desired segmentation of images that are difficult to segment by the existing region based segmentation methods of grayscale image.

In conventional tracking methods, a unique characteristic that is found in an image and represents an object of interest can be used to perform tracking of an object recorded in a grayscale image. Accuracy of object tracking using the conventional methods is, however, affected by the magnification of the object of interest and the number of objects recorded in an image. Particularly, a large number of objects are recorded in an image, and as a result, it becomes challenging to track an object using the conventional methods. However, by performing object tracking using segmented area and analyzing surrounding segments of the target segment, the present methods and systems provide desired tracking results that are difficult to perform by the existing tracking methods.

The methods and system presented here will have an advantage to segment grayscale images obtained from various devices and track segmented areas over the methods that have been used Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIGS. 7A-7C are examples of the customized background making.

FIG. 8 is a block diagram illustrating the creation of stitched images.

FIGS. 9A-9B are examples of stitched images, which were prepared without or with performing a background correction using customized backgrounds.

FIGS. 11A-11J are examples of image segmentation using images of cervical cancer cells, HeLa, and pancreatic cancer cells, MiaPaCa2.

FIGS. 12A-12L are schematic illustrations of the image segmentation. FIGS. 12M-12O illustrate the magnified line extension, edge linking, and edge expansion, respectively.

FIGS. 13A-13J are examples of image segmentation of HeLa cells, MiaPaCa2 cells, C2C12 cells, myotubes, a bird colony, a brain section of magnetic resonance image, dog sausages, and one of a slices of a computerized tomography (CT) scan of a mouse. To archive the results of segmented areas, a unique ID was assigned to all segmented areas. FIG. 13I is a magnified image of FIG. 13H. FIG. 13J is a next slice of CT scan image that is shown in FIG. 13I. An object in FIG. 13J that corresponds to an object in FIG. 13I is indicated by the black arrow.

FIGS. 17A-17L are schematic illustrations of the automatic segmented area tracking.

FIGS. 20A-20B are examples images of cell tracking.

FIG. 21 is an example analysis of cell growth.

DETAILED DESCRIPTION OF THE INVENTION

Figure 1:
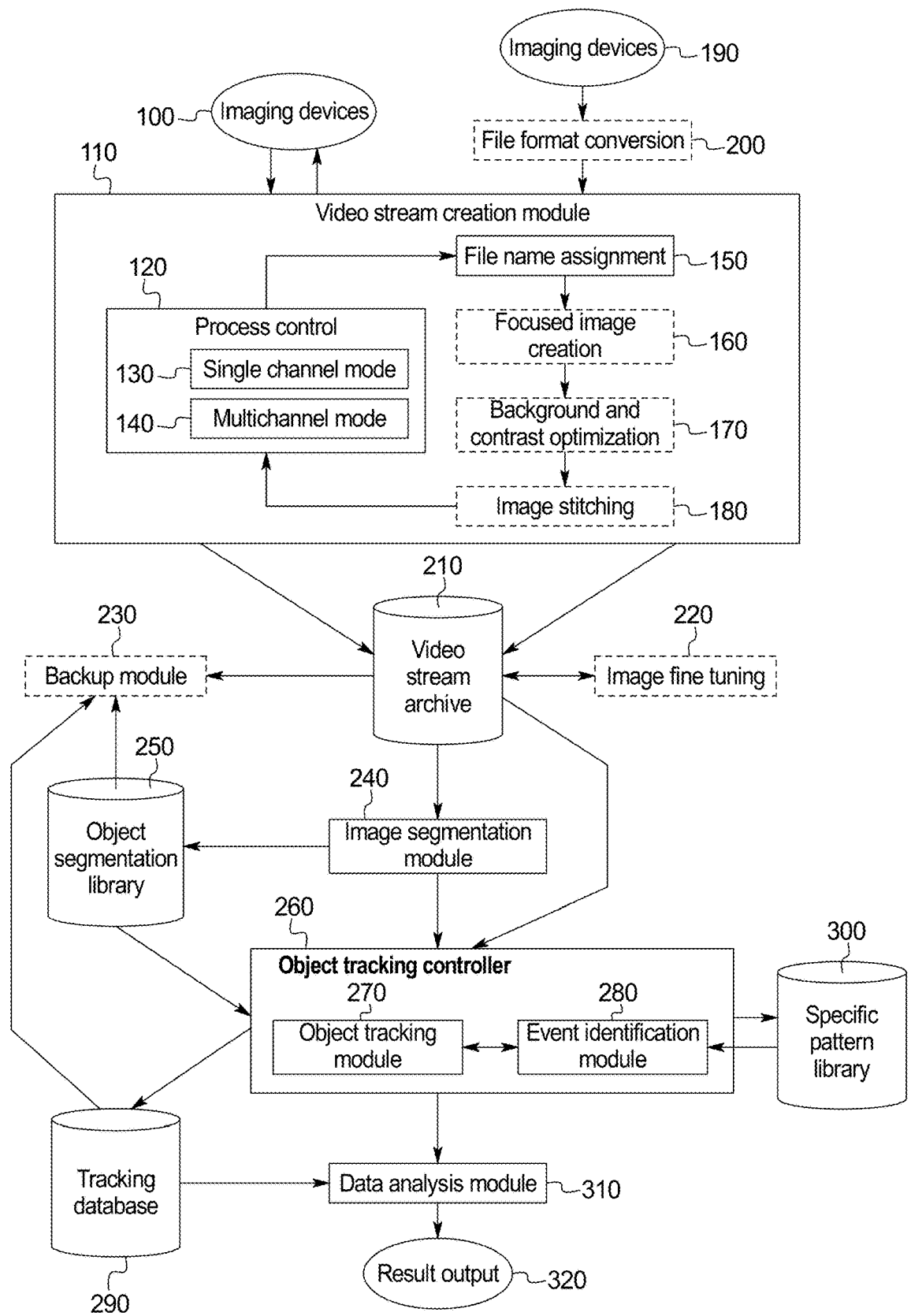
FIG. 1 is a block diagram illustrating the image segmentation and object tracking system.

The image segmentation and segmented area tracking system identifies and tracks a segmented area (target segmented area) that corresponds an object of interest through a set of images within a video stream or three-dimensional slices. As a grayscale image contains less information compared with a color image, boundary of a tracking target object with other objects that are closely located or attached to the target object are often difficult to be determined. Thus, in the present system, the image segmentation is performed by a method that is referred to as Stepwise Area Expansion (SAE). SAE includes extracting pixels that are higher than a series of threshold values from an original image, followed by identifying pixels that have larger value than the highest thresholding value, carrying out connectivity analysis to create a group of pixels, determining edge pixels that surround the connected pixels, overlaying the edge pixels onto the original image, expanding a line from the edge pixels as long as a pixel value satisfies a condition (e.g. the pixel value is within 50 plus or minus from the pixel value of its origin), and determining primary temporal areas by connecting the end of extended lines. The primary temporal areas are created around the brightest objects found in the original image. These primary temporal areas can be overlaid onto the area of pixels that have a larger value than the second highest thresholding value, wherein the system can perform connectivity analysis of pixels that are not overlapped with primary temporal areas. The connectivity group of pixels created can be processed by determining edge pixels that surround the connected pixels, overlaying the edge pixels onto the original image, expanding a line from the edge pixels as long as a pixel value satisfies a condition, and determining the secondary temporal areas by connecting the end of extended lines. In addition to, overlaid-primary temporal areas are expanded 1-3 pixel outside, wherein the expanded primary temporal areas and secondary temporal areas are overlaid to remove overlaps. The overlaid-primary temporal areas may expand and secondary temporal areas can be created around darker areas than that of primary temporal areas. After repeating the processes for pixels extracted by using lower thresholding values, segmented areas can be determined. In the instance that two closely located objects individually contain brighter pixels, two objects can be segmented by SAE. In an instance that a dark object is located nearby a bright object, the dark object and the bright object can individually be segmented by SAE.

In some instances, the segmented area may use to track an object recorded in a video stream or three-dimensional slices. As segmentation patterns may change image to image, or slice to slice, image segmentation and segmented area tracking system may perform segmented area tracking across a video stream or three-dimensional slices by evaluating segmented areas that surround the target segmented area. Segmented areas of following images or slices may be divided or merged to determine the target segmented areas. Furthermore, the system can determine specific events that occurred in the target segmented area in the events that multiple target segmented areas or no segment area are found in the following images or slices. The segmented area tracking and event detection data can be interpreted as tracking data of an object of interest and of events occurred in an object.

The image segmentation and area tracking system may use grayscale images generated by various apparatus, including but not limited to microscopes, medical apparatus, and remote sensing devices, by coordinately creating images with the apparatus, or by processing images that are already created by the apparatus. The image segmentation and area tracking system may create a video stream archive, database for segmented areas and tracking data that can be used to perform data analysis. Alternatively, or in addition to, events, such as division, merging, attaching or losing of segments, may detect by the Image segmentation and area tracking system to characterize an object that corresponds to a segmented area.

FIG. 1 is a network diagram depicting Image segmentation and area tracking system. In an example, Imaging devices (100) and (190) be independently selected from, but not limited to, video cameras, microscopes, medical apparatuses, such as positron emission tomography scan, computerized tomography (CT) scan, magnetic resonance imaging, and x-ray radiography, and remote sensing devices that generate grayscale images. As is understood, skilled artisans in the relevant computer, each module shown in FIG. 1 can include a set of executable software instructions and the corresponding hardware for executing the instructions, forming hardware-implemented modules or engines and acting, at the time of the execution of instructions, as a special purpose machine configured to carry out a particular set of functions. To avoid obscuring the inventive subject matter with unnecessary details, various functions modules and steps that are not germane to conveying an understanding of the inventive subject matter have been omitted from FIG. 1. Of course, additional functional modules and steps may be used with other imaging devices to facilitate additional functionality that is not specifically described herein. Furthermore, the various functional modules and steps depicted in FIG. 1 may reside on a single computer or may be distributed across several computers or devices in various arrangements.

Imaging devices (100) may coordinately generate images with the Video stream creation module (110). As shown in FIG. 1, communication between the imaging device (100) and the Video stream creation module (110) may carry out using a set of executable software instructions. In an example, Imaging device (110) may be a computer controlled microscope equipped with a function to perform a long-term live cell imaging and generate imaging files in a format such as tiff, and an executable software instructions of the Video stream creation module (110) may monitor the progress of image file creation performed by the computer-controlled microscope and fetch the files using a set of executable software instructions to the Video stream creation module (110). In an example, a set of executable software instructions of the Video stream creation module (110) may display a status of image acquisition such as the position of the objective lens relative to the stage position of microscope and position of the field of views. The field of views may be referred to as a two-dimensional image acquisition array. The Video stream creation module (110) can set x-y positions of the field of views, two-dimensional image acquisition arrays, z positions of the field of view to adjust focus, and the angles of DIC prism to optimize DIC of each field of views. For example, z can be more than one. Other parameters that are required to control the computer-controlled microscope may set using the Video stream creation module (110). These parameters may send to the computer-controlled microscope. In an example, executable software instructions that fetch files from the computer-controlled microscope may refer to as File Transfer software, and a set of executable software instructions that display a status of imaging acquisition and set parameters required to control the microscope may refer to as Map software for convenience. Although exemplified herein as a computer-controlled microscope, other examples include other imaging devices that may connect with the Video stream creation module (110).

As shown in FIG. 1, the Process control (120) may control the process of image processing by two modes, i.e. the Single channel mode (130) and the Multichannel mode (140). In an example, the Single channel mode (130) may process images generated by a single imaging method, such as near-infrared DIC imaging or phase contrast imaging. For example, near-infrared DIC images generated by a computer-controlled microscope may process the image using the Single channel mode (130) by assigning a unique file name (150). In other instances, name-assigned files may further be processed by the Focused image creation (160) that generates a focused image from the name-assigned files in the event that the files are multi-layered files, and contain a focused image within a layer of images. In an example, the background and contrast of the focused image may be optimized by the Background and contrast optimization (170), and background- and/or contrast-optimized images may be stitched by the Image stitching (180) in the event that an area of interest is imaged by multiple fields of view. In an example, the Process control (120) may repeat the process of (150), (160), (170) and/or (180) upon receiving images from the Imaging devices (100). In some embodiments, the order of processing of (150), (160), (170) and (180) may be changed. In some instances, a set of executable software instructions for the Process control (120), the File name assignment 150, and the focal image creation may refer as to Image processing controller, Name assignment, and Focal image selection software, respectively. In an example, a set of executable software instructions of the Background and contrast optimization (170) and the Image stitching (180) may refer to as Contrast set software.

In an example, the Multichannel mode (140) may process images generated by multiple imaging methods, such as near-infrared DIC imaging with fluorescent imaging. In an example, multiple channels of images may be acquired at the same image acquisition cycle. The File name assignment (150) can add a unique identifier to each file of additional channels of images. Multiple channels of images that can be assigned a unique name may be processed by (160), (170) and/or (180). In an example, the Multichannel mode (140) may perform following image acquisitions with Single channel mode (130) by merging two video streams. Samples that are used for the imaging with the Single channel mode (130) may be treated to stain with a dye of interest, and perform imaging with the Multichannel mode (140) after adjustment of the shift of the position of samples.

As shown in FIG. 1, a various format of image created by imaging devices (190) may convert into a format that can process by the Video creation module (110) using the File format conversion (200). The Video stream creation module (110) may use an 8-bit 512×512 pixels grayscale tiff to process image files, and thus a non-8-bit tiff grayscale image can be converted into an 8-bit tiff image. A grayscale image larger than 512×512 pixel may divide into 512×512 pixel images, or a smaller dimension of image or a non-square image may convert into a 512×512 pixel images by the File format conversion (200). Although exemplified herein as a grayscale image generated by Imaging devices (190), other examples may include other formats of images, such as a color image that may convert into a grayscale image by extracting brightness of each color channel of pixels, and of pixels that represent a value of a range of a color. Images that are already created by Imaging devices (190) can be processed by the File format conversion (200), and the modules and the steps of the Video stream creation module (110). A set of executable software instructions for the File format conversion (200) may refer to as File converter software.

Images generated by the Video stream creation module (110) can be stored in the Video image stream archive (210), which is an assembly of image files. An assembled image file stored in the Video image stream archive (210) may be viewed by Image fine tuning (220). The Image fine tuning (220) can also perform fine tuning of assembled images by adjusting contrast and brightness, and aligning an image position between one image with the next image, and between one channel of an image with other channels of images in the event that images are obtained using the Multichannel mode (140). Assembled image files stored in the Video stream archive (210) may backup using the Backup module (230) in coordination with the Video stream creation module (110) or directly from the Video stream archive (210). A set of executable software instructions for the Image fine tuning (220) and the backup module may refer to as File converter and Data backup software, respectively. In the instance that objects recorded in a video stream are cultured cells, the Video stream archive (210) may refer to as the live cell imaging video archive.

Original images created by Imaging devices (100) and (190) can be backup using the Backup module (230). The original images can be used for post-image acquisition processing using the video stream creation module (110). Images created by the Focal image creation (160) can be backup using the Backup module (230) and used for post-image acquisition processing using the Video stream creation module (110).

In the event that the Multichannel mode (140) is used, one video stream may be selected for image segmentation using the Image segmentation module (240). When one of the video streams is composed of near-infrared DIC or phase contrast images, such streams may be selected for image segmentation. The results of image segmentation of a selected video stream may use to characterize objects recorded in other channels of video streams. The Image segmentation module (240) may perform segmentation of images in each channel individually. Each segmented area can be numbered and information associated with the segmented area can be stored in the Object segmentation library (250). Information may include x-y positions of and values of pixel that constitute a segmented area and numbers assigned to a segmented area. In another instance, such information may include x-y positions of and values of pixel that constitute a circle surrounding a segmented area. Data stored in the Object segmentation library (250) can be backup using the Backup module (230). A set of executable software instructions for the Image segmentation module may refer to as Outline drawing software.

Segmented areas or circles surrounding the segmented areas can be used to track an object using the Video stream archive (210), the object segmentation library (250) and the Object tracking controller (260). The Object tracking controller (260) can be a set of executable software instructions that have functions to track a segmented area (target segmented area) or a circle surrounding a segmented area in an interactive mode, and to control automatic segmented area tracking by controlling the Object tracking module (270) and the Event identification module (280). The specific pattern library (300) can be created to detect certain types of event. When cells are tracked, patterns stored in the Specific pattern library (300) can be shapes of mitotic cells, and the patterns can be used for the Event identification module (280) to determine whether cells are entered into mitosis. Results of the tracking of a segmented area and an event occurred in a segmented area can relate to objects recorded in an original image. When cells are tracked, a human-readable label, such as cell number, cell lineage number, type of cellular event, e.g. bipolar cell division, tripolar cell division, tetrapolar cell division, multipolar cell division, cell death, cell shape alteration, and cell fusion, can be assigned to the related object. When birds are tracked, a human-readable label, such as bird number and type of bird can be assigned to the related object. When clouds are tracked, a human-readable label, such as cloud number, type of cloud, type of event e.g. generation of cloud, merging cloud, dividing cloud, and disappearance of cloud can be assigned to the related object. When objects visualized by magnetic resonance or computerized tomography scan are tracked through three-dimensional image slices, a human-readable label, such as tumor type, can be assigned to the related object. magnetic resonance image Tracking of a segmented area may perform one segmented area at the time. In the instance that shapes of mitotic cells are recorded, the Specific pattern library (300) may refer to as mitosis pattern library. A set of executable software instructions for the Object tracking controller (260) may refer to as the object tracking controller, and the Object tracking module (270) together with the event identification module may refer to as Automatic object tracking software.

The results of segmented area tracking can be stored in the Tracking database (290). The database can contain information, including but not limited to x-y positions of pixel comprising a segmented area, x-y positions of pixel comprising a circle that surrounds a segmented area, pixel values, an average intensity of a segmented area, size of a segmented area, and a number assigned to a segmented area. The same set of data for each channel of images can be stored in the event that Multichannel mode (140) is used. In the instance that an object recorded in images is a cell, a cell number and a cell lineage number that can be assigned to a group of cells derived from same progenitor cell can be stored in the Tracking database (290). Furthermore, the information that relates a progenitor cell to its progeny can be included in the Tracking database (290). Tracking database (290) can be backed up using the backup module (230) and the tracking database that stores the information of cells can refer to as the Cell lineage database.

As shown in FIG. 1, data stored in the Tracking database (290) may be used for data analysis using the Data analysis module (310). This module can include various functions, including but not limited to visualizing the results of tracking of a segmented area, calculating parameters of interest based on tracking data and simulating a behavior of a segmented area or an object that corresponds to a segmented area. The Data analysis module (310) may include multiple data set at the same time. The Data analysis module (310) may include various set of executable software instructions that can be used for specific types of analyses. The results of an analysis can be output (320) in various format of files, including but not limited to PDF, EPS, tiff and jpg files, and text and Excel files. The results of an analysis can be printed out, or stored on a hard drive or other data storage devices. A set of executable software instructions for the Data analysis module (310) can refer to as Data analysis software.

Figure 2:
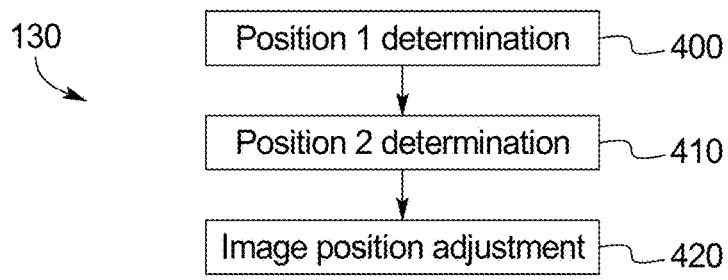
FIG. 2 is a block diagram illustrating multiple channel image processing.

FIG. 2 depicts a flow diagram illustrating an example of position adjustment of a video stream upon merging a video stream created by the Single channel mode (130) with another video stream created by the Multichannel mode (140). A long-term live cell imaging is performed by a near-infrared DIC microscopy using the Single channel mode (130) and, after the imaging, images that are created by a fluorescent imaging using the Multichannel mode (140) can be merged. The Process controller (120) can perform to record a snapshot of a near-infrared DIC image at the end of imaging with the Single channel mode (130).

Figure 3A:
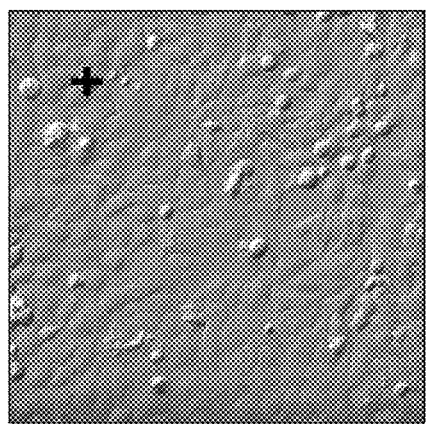
FIGS. 3A-3B are examples of image position adjustment to merge two different video streams into one stream.
Figure 3B:
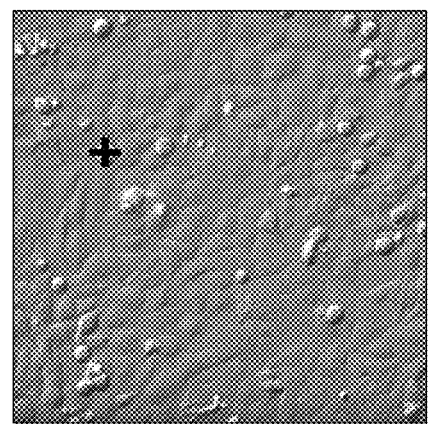

FIGS. 3A-3B are examples of image position adjustment to merge two different video streams into one stream. More precisely, the example shows a method to add the second stream following the first stream. In the example, at the end of the first stream, i.e. a stream created by a microscope for the long-term near-infrared DIC live cell imaging of HeLa cells, Snapshot 1 was taken. To generate the second stream, cells were stained with a fluorescent dye of interest. Then, Snapshot 2 was taken using near-infrared DIC imaging to align the image position of the second stream with the first stream. The alignment was performed by marking an identical object found in Snapshots 1 and 2, and calculating x and y position shifts. Then, the second stream was created by performing imaging by considering the shifts using a relevant light source to excite fluorophores.

Specifically, FIGS. 3A-3B show an example of an image of HeLa cells taken at the end of the imaging (FIG. 3A). A unique object in FIG. 3A was marked using the Process controller (120) to record the x-y position of the object (400). Cells can be treated with a relevant reagent, such as a cell fixation reagent, a washing reagent and an antibody, protein conjugated, or RNA conjugated with a fluorophore on a microscope stage or after removal of cells from a microscope stage. With the latter regard, cells can be placed back to the microscope stage after the treatment. These cells can be visualized by a near-infrared DIC imaging and the Process controller (120) can record the second snapshot image (FIG. 3B). A unique object in FIG. 3B is marked using the Process controller (120) to record the x-y position of the object (410). The differences between x and y positions can be calculated (420) and generated a new position data that can be used for a long-term live cell imaging microscope to acquire images. The microscope can perform a multi-channel imaging, such as near-infrared DIC imaging together with fluorescent or luminescence imaging, and the Multichannel mode (140) can process images created by the imaging.

Figure 4:
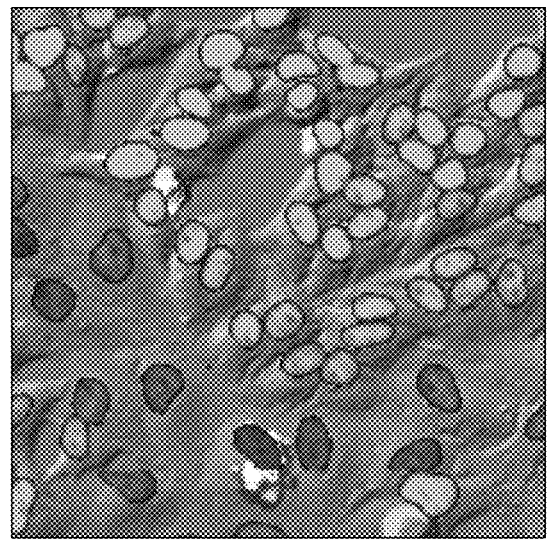
FIG. 4 is an example result of image position adjustment. In the example, the second stream, such as a fluorescent image (DAPI staining of nuclei), was merged with the first stream created by near-infrared DIC imaging. Near-infrared DIC image of HeLa cells was overlaid with nuclei stained with DAPI.

In FIG. 4, an example of imaging using the Multichannel mode (140) is shown. The image can be displayed using a set of executable software instructions for the Image fine tuning (220), and near-infrared DIC image was overlaid with DAPI-stained nuclei of fluorescent image after the adjustment of the position of a sample following a flow diagram illustrating in FIG. 2.

Figure 5:
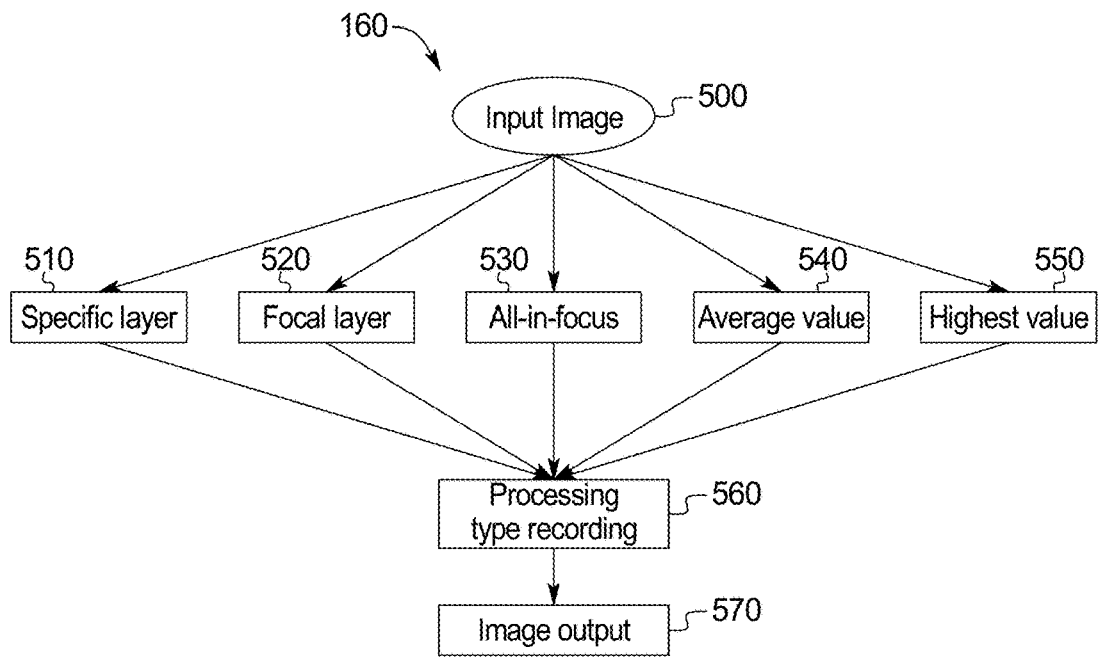
FIG. 5 is a block diagram illustrating the creation of a focused image.

FIG. 5 depicts a flow diagram illustrating an example of the Focused image creation (160). Input image (500) may be a multilayer tiff file that contains z-axis of images. Focused image creation can be performed by specifying layer as a focused image (510), selecting a layer that contains pixels showing the smallest standard deviation of pixel value distribution and a Sobel-edge extraction value (520), or constructing an image by collecting focused pixels across the layers to create an all-in-focus image (530). In the instance that fluorescent images are processed, an image can be constructed by calculating the average value of pixels across the layers (540) or by selecting the pixel having the highest value among the layers (550). Image processing type can be changed during the process of video image stream creation. In some instances, image processing type can be recorded by the Processing type recording (560). In the instance that the Specific layer (510) is selected, a focal layer number can also be recorded. The recorded data can be used upon performing post-image acquisition processing from original images that are backed up by the Backup module (230). Processing type can be changed. In the preferred embodiment, the Output image (570) may be an 8-bit or 16-bit grayscale image. Of course, other formats of grayscale image can be used, as is understood by skilled artisans in the relevant computer and image processing.

Figure 6:
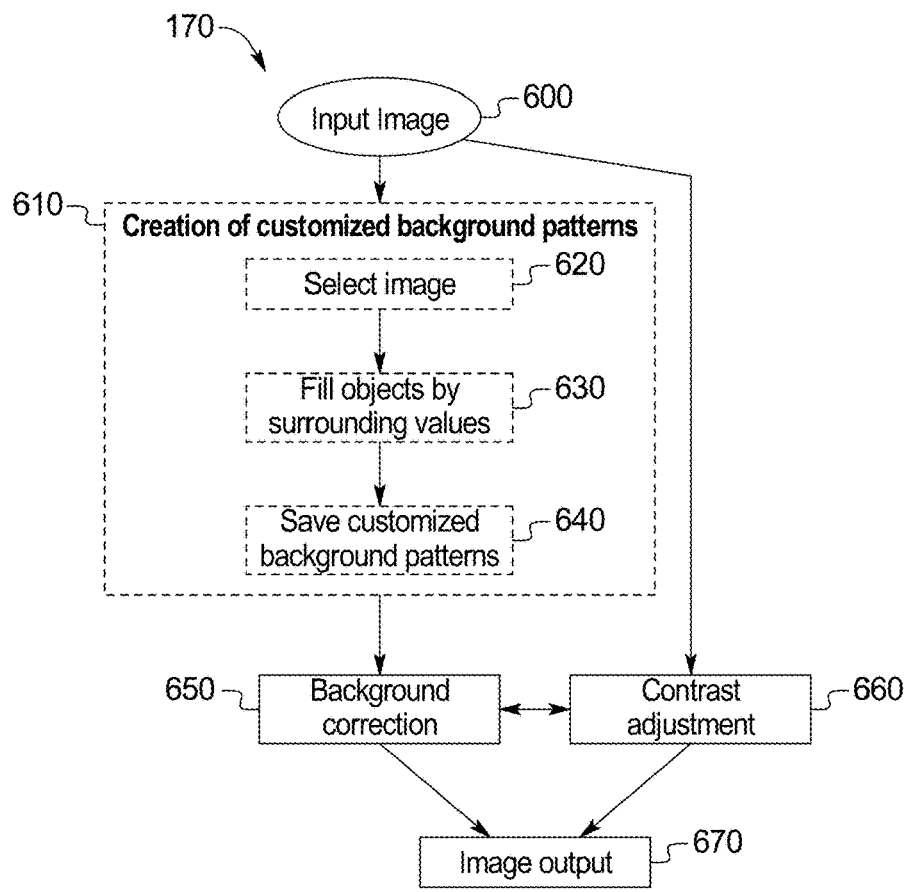
FIG. 6 is a block diagram illustrating the procedure of background correction using a customized background.

FIG. 6 depicts a flow diagram illustrating an example of the Background and contrast optimization (170). The input image may be an 8-bit grayscale image (600). The background of the input image may be normalized by creating customized background patterns (610). Background i.e. a non-uniformity of image, can be generated by various causes. For example, such a non-uniformity can be created upon performing a long-term live cell imaging microscopy due to the shape change of cultured medium surface, light scattering caused by the partition of chamber or dish that used for culturing cells on a microscope, the formation of cell debris, the alteration of density and various physical factors, including but not limited to non-optimal angle of DIC prism, non-uniformity of the transmittance of an objective lens, and dust entered into a light path and dirt attached to objective lens or other optical parts. Such a non-uniformity can be corrected using customized background patterns for each image. Such patterns can be prepared by selecting one of images created by the Focal image creation (160) or one of the images that are saved in the Video stream archive (210). The selected image can be an 8-bit grayscale image with a 512×512 pixels dimension and the image can be converted into 64×64 blocks (8×8 pixels).

In FIGS. 7A-7C, an example of a 64×64 block image of HeLa cells acquired by the near-infrared DIC imaging is shown. To create a customized background, objects recorded in the image are removed. In the instance shown in FIGS. 7A-7C, an object indicated by white arrows was removed by filling the object with a pixel value (630). For example, if the pixel value of left side of the object is 100, the pixel located the right side of the object is 120 and the distance of both pixels is 20, filling values between the pixels is calculated by; value=round ((120−110)/20)×pixel position from the left. Such filling can be performed by selecting a pixel located at the right- and the left-, or the up- and the down-side of an object. In FIGS. 7A-7C, an object that is indicated by white arrows can be removed by filling pixel values. Other objects can also be filled in the same manner to create a customized background pattern. Multiple customized background patterns can be prepared to determine an optimal pattern for each fields of view. One customized background pattern can be used for correcting background of multiple images by adjusting contrast and brightness of the customized background pattern. Customized background patterns can be saved (640) in the Background pattern library on a hard drive or other types of data storage device. The Background and contrast optimization (170) can record a customized background pattern that corresponds to each field of view.

Background correction can be performed by determining the mean grayscale value of 64×64 blocks, calculating the difference of the values between the mean value from each of 64×64 block, and subtracting the differences from a pixel value of the corresponding image (650). Adjustment of contrast and brightness of the image (660) can be performed before or after performing the correction (660). Adjustment of contrast and brightness may perform without using a customized background pattern. Blank parts of the image can be filled with certain pixel value to facilitate image segmentation. For example, blank parts can be a culture dish, where no cells are found. In such instance, the blank parts can be filled by pixel value 100 of 0-255 grayscale, and pixel values found in objects between 95 to 99 and 101 to 105 can be converted into 94 and 106, respectively. The Image segmentation module (240) may determine the blank parts upon detecting a pixel value of 100. In the event that pixel value of blank parts is close to 0 or 255 of 0-255 grayscale, filling of the blank parts may not be required to perform. In some embodiments, contrast-adjusted and background-adjusted image can be output by an 8-bit grayscale image (670). Of course, other formats of grayscale image can be used, as is understood by skilled artisans in the relevant computer and image processing.

FIG. 8 depicts a flow diagram illustrating an example of the Image stitching (180). Image output (670) can be used as Input images (700) in the events that multiple fields of view are used to cover an area of interest. In some instances, these images can be displayed on a monitor and positions of each field of view can be adjusted. Such adjustment can be performed by moving an image of a field of view against an immediate-above image to align y position, and against an immediate-left image to align x position. In such instance, moving distance of x and y can be recorded and the recorded distance can be used to adjust positions of all other images (710). Each image can be stitched into one image by taking into account the x and y position shifts (720). A stitched image can be output as an 8-bit grayscale image (730). Of course, other formats of grayscale image can be used, as is understood by skilled artisans in the relevant computer and image processing.

In FIGS. 9A-9B, an example of a stitched 5×5 dimension of images of HeLa cells acquired by the near-infrared DIC imaging is shown. An image that is created without applying a customized background pattern shows borders of images corresponding to each field of view and some non-evenness of background. After applying the Background correction (650) using a customized background pattern, non-uniform backgrounds were flattened and blank parts were filled by 100 of 0-255 grayscale.

Figure 10:
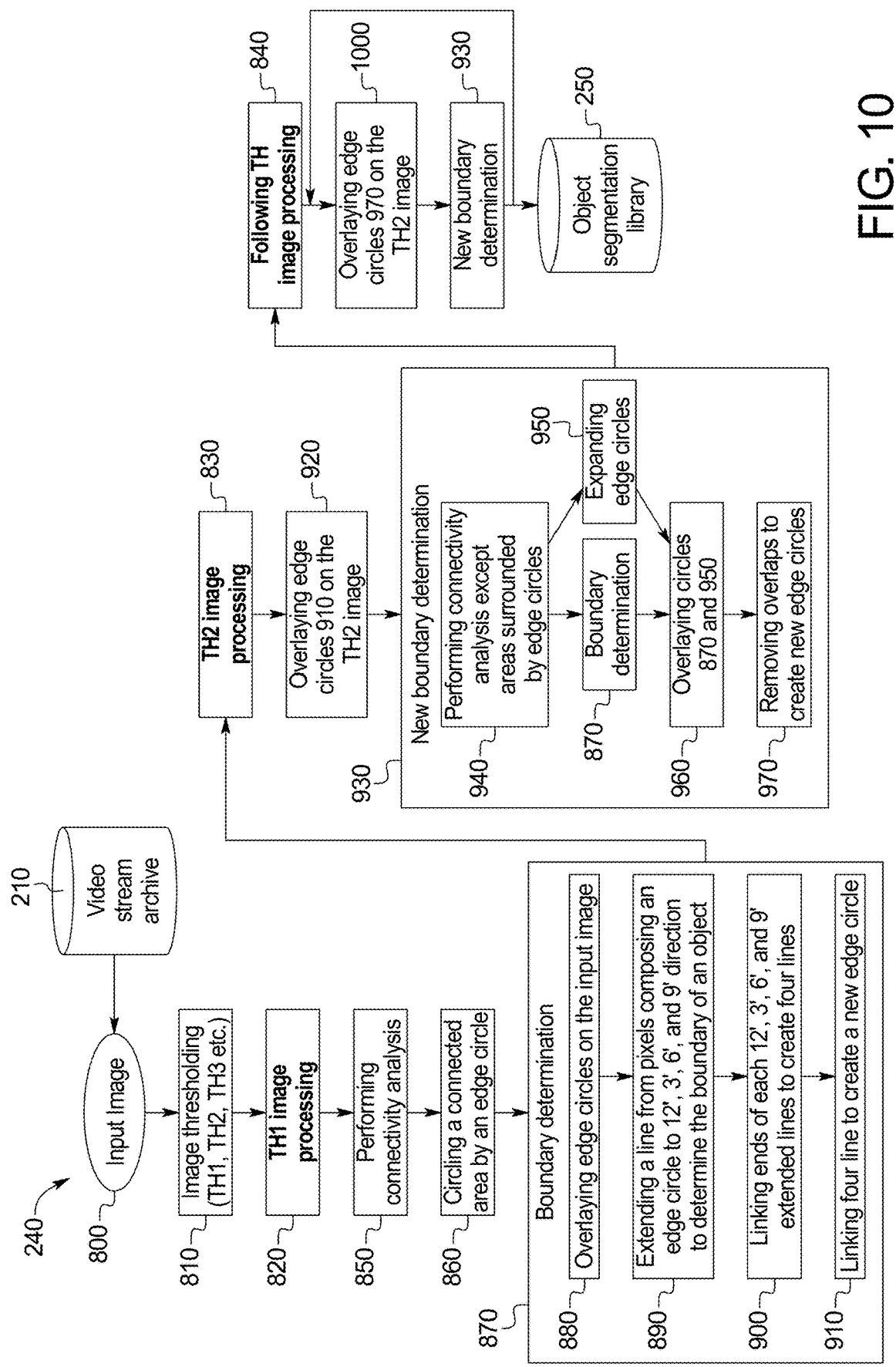
FIG. 10 is a block diagram illustrating the image segmentation using Stepwise Area Expansion.

FIG. 10 depicts a flow diagram illustrating an example of the grayscale image segmentation performed by SAE. An image file assembly that is stored in the Video stream archive (210) may be used for image segmentation. An individual image in the assembly can be used for the image segmentation as an input image (800). As shown in FIG. 10, pixels, of which value are larger than a selected threshold value, can be extracted by the Image thresholding (810). For example, in the event that threshold is 200 of 0-255 grayscale, pixels that have a larger value than 200 can be extracted. In some instances, the pixel values can be converted into one value, such as 150, to perform a connectivity analysis. At least two threshold values are used to perform segmentation by SAE, and in the preferred embodiments, at least 4 thresholds values are used. In the flow diagram shown in FIG. 10, the TH1 represents the highest threshold value, and lower threshold values may be selected for TH2, TH3 and TH4, and others in the event that more than 4 thresholds are used. Segmentation of an image can be started with the processing of TH1 image (820), followed by TH2 (830) and repeated the processes that are performed for TH2 for the rest of TH images created using lower thresholds (840).

In FIGS. 11A-11J, representative examples of segmentation using SAE is shown. Near-infrared DIC of HeLa and MiaPaCa2 cells can be processed by the thresholding using 4 different values, such as 200, 170, 140 and 110 of 0-155 grayscale, and the results of segmentation following the processing of TH1, TH2, TH3, and TH4 are shown by dark gray circles. In these instances, data obtained following the process of TH4 can be output as segmented areas. A flow diagram shown in FIG. 10 depicts steps that are involved in the image segmentation by SAE and the steps are schematically illustrated in FIGS. 12A-12L.

FIGS. 12A-12L is the schematic illustration of the image segmentation. Connectivity analysis was performed using TH1 to identify connective pixel edges outlined by edge circles (FIG. 12A: Edge circles, light gray circles). The circles were overlaid onto the near-infrared DIC image and lines extended from the pixels within the regions towards the 12, 3, 6, and 9 o'clock directions (FIG. 12B: Line extension, and FIG. 12M: Line extension (magnified)) to possible cell boundaries. The ends of extended lines of each direction were linked to create four lines (FIG. 12C: Edge linking, and FIG. 12N: Edge linking (magnified)) and a new area was created by linking the four lines (FIG. 12D: Creating new areas: dark gray circles). These edge circles surrounding the new areas were then overlaid onto the TH2 image (FIG. 12E: dark gray circles) and connected pixel edges that did not overlap with dark gray circles were determined (FIG. 12E: light gray circles). Light gray circles were processed as described for TH1 (FIGS. 12F-H). Dark gray circles were expanded for 1 pixel outside the edge circles (FIGS. 12K and 12L, white circles, and FIG. 12O: Edge expansion (magnified)). Finally, dark gray and white edge circles were overlaid to detect overlaps (FIG. 12I: Overlay), which were then removed (FIG. 12J: Removal of overlaps). These processes were repeated for images generated using lower threshold values, e.g. TH3 and TH4. FIGS. 12M-12O illustrate the magnified line extension (FIG. 12M), edge linking (FIG. 12N), and edge expansion (FIG. 12O).

The processes of segmentation can start with the processing of TH1 image (820). In this instance, pixels found in the image of TH1 can be grouped using a connectivity analysis, which identifies pixels that are attached together (850), and such group of pixels is referred to as a connectivity group. Pixels that surround a connected pixel group can be identified (860 and FIG. 12A, light gray circles). Such pixels that can form a circle surrounding a connected pixel group is referred to as an edge circle, which is used to determine a boundary of objects by the Boundary determination (870). The TH1 edge circles are overlaid on the corresponding near-infrared DIC image (880 and FIG. 12B). The pixels composing the edge circles are referred to as the original pixels. Using the overlaid near-infrared DIC image as a reference, the values of pixels from the original pixel is examined for 12 o'clock direction (890, FIG. 12B, and line extension (magnified)). In some instances, the ends of the pixels are extended until the values became either 100 (representing blank parts that no object of interest is found), or 50 above or below the original pixel, as long as those extensions are towards the outside of the edge circles. The final pixel positions are determined by this technique. In some instances, this extension is continued for 20 pixels distant from the original pixel. Similar examinations are performed for the other three directions (890, FIG. 12B, and Line extension (magnified)), and the final pixel positions are then linked to create four directional lines corresponding to the 12, 3, 6, and 9 o'clock directions (900, FIG. 12C and Edge linking (magnified), L12', L3', L6', and L9'). Finally, the four lines are linked to make an edge circle (910, and FIG. 12D, dark gray circles) to complete the initial segmentation for the first TH1 image. The TH1 edge circles are then overlaid onto the TH2 image (920) to perform the New boundary determination (930), and another connectivity analysis is performed, except for the area surrounded by TH1 edge circles (940). Two types of the edge are found at this stage, i.e. circles created by the processing of TH1 image circles (940, and FIG. 12E, dark gray circles) and newly created circles by connectivity analysis (940, and FIG. 12E, light gray circles). The light gray circles that emerge in the TH2 image are overlaid onto the corresponding near-infrared DIC image (FIG. 12F), the pixel value of each original pixel in the edge circles is examined and extended (FIG. 12F), the final pixel positions are determined (FIG. 12F), and the ends are linked to create four lines (FIG. 12G) and new edge circles are created (FIG. 12H), as described for the Boundary determination (870). As for the dark gray circles, a different expansion approach is used (950). In this instance, the location of each pixel on the edge of the circles (FIG. 12K, dark gray circles) is moved by 1 pixel outside the original (FIG. 12L, white circles, and Edge expansion (magnified)) to create the expanded circles (FIG. 12L). In other instances, the edge of the circles can be moved more than 2 pixels outside of the original. Both the dark gray TH2 (FIG. 12H) and white TH2 circles (FIG. 12L) are then overlaid onto the TH2 image (960, FIG. 12I) and circle overlaps are removed to create new edge circles (970, and FIG. 12J). Those new edge circles are then applied to TH3 image (840) by overlaying new edge circles (970), carrying out another connectivity analysis (1000), except for the area surrounded by edge circles (970) and performing the New boundary determination (930). In some instances, steps (1000) and (980) can be repeated for the TH4 images, and other TH images in the event that more than 4 thresholds are used. In some instances, a unique ID is assigned to a segmented area following the processing of TH4 image or TH image created by applying the lowest selected threshold values, and information related to the results of segmentation and the ID are stored into the Object segmentation library (250). In this instance, information may include x-y positions and values of pixel that constitutes a segmented area and a number assigned to a segmented area. Such information may include x-y positions and values of pixel that constitutes a circle surrounding a segmented area. In some instances, multiple segmented areas may assign to one object or one segmented area may assign to one object. The Image segmentation module (240) can set the minimal area size of a connected pixel group. So, the level of segmentation may be controlled by setting the appropriate area size to avoid over-segmentation.

In FIGS. 13A-13H are examples of segmentation of grayscale image using SAE are shown. In the example of an image of low-density HeLa cells, high-density HeLa cells, MiaPaCa2 and C2C12 cells, mainly one segmented area was assigning to one cell. In the example of myotube, multiple areas were assigned to one myotube. A bird colony, a brain section of magnetic resonance image, dog sausages, and a mice section of computerized tomography scan can also be segmented by SAE.

Figure 14:
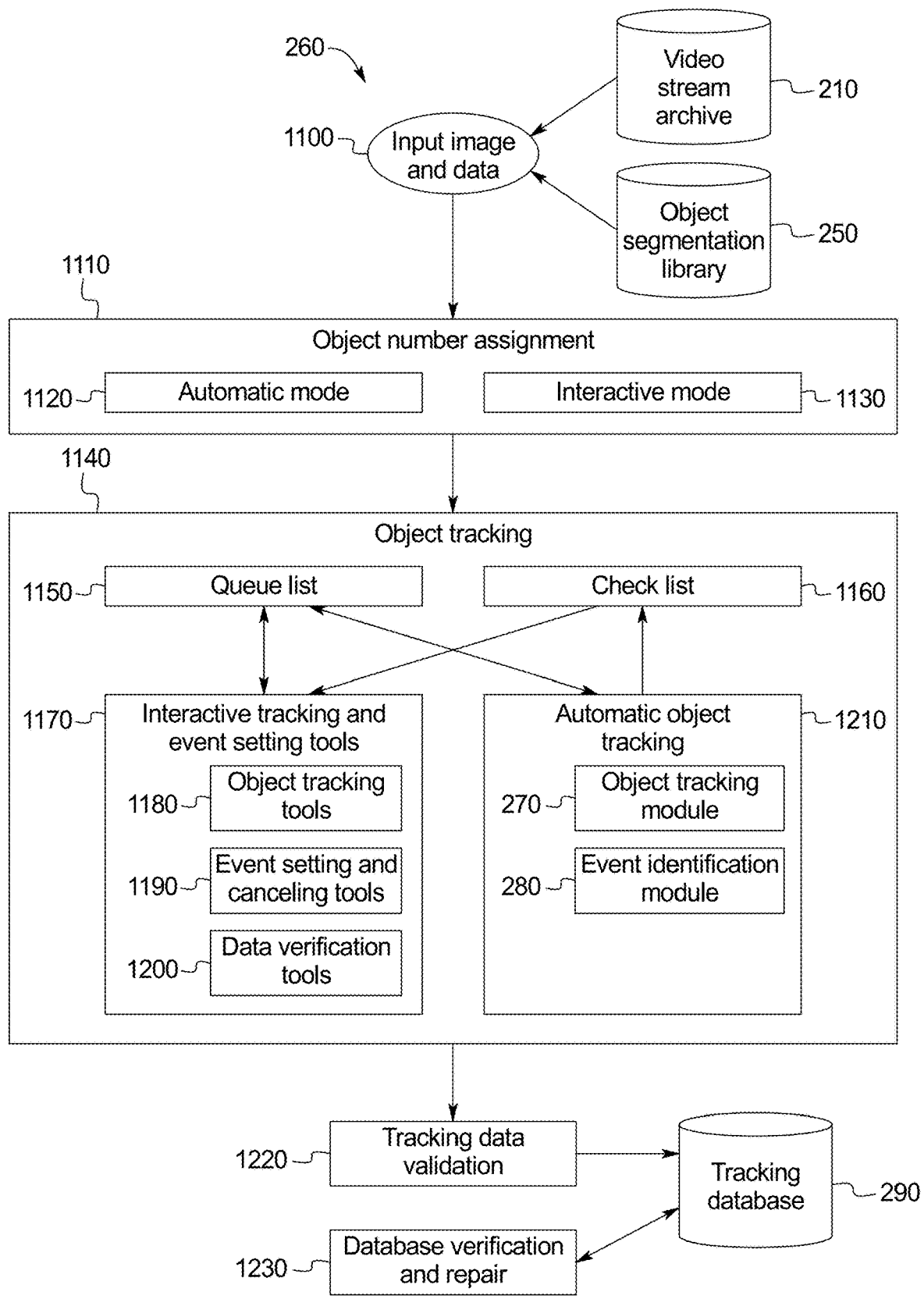
FIG. 14 is a block diagram illustrating the object tracking using segmented areas.

FIG. 14 depicts a flow diagram illustrating an example of the object tracking controller. The Object tracking controller (260) can control the processes of the tracking of a segmented area that represents an object, interpret object tracking data, and create the Tracking database (290). An image file assembly stored in the Video stream archive (210) and data related to segmented areas stored in the Object segmentation library (250) can be used as Input image and data (1100). Images at time point 1 and corresponding segmented area data may be used to assign an object number that represents a target segmented area (1110). An image at the time point where segmented area tracking is started is used to assign an object number to a segmented area that represents an object (1110). An object number can be referred to as a cell number. In an additional instance, other types of numbers may be assigned to one object. For example, a cell number and a cell lineage number that represents a group of cells derived from the same progenitor cell can be assigned to the same segmented area. Assignment of an object number can be performed using Automatic mode (1120). A temporal object number can be assigned by evaluating area size, brightness of the area and the degree of attachment of one segmented area with other areas. For example, segmented areas are grouped based on the degree of attachment, such as 10 pixels of a segmented area is located with 10 pixels of another segmented area, followed by the identification of brightest area among a group of segmented areas, the evaluation of attached segmented area to the brightest area and the determination of attached area in the event that the area size of the attached area is less than 50% of the brightest area. In this instance, the brightest area can be determined as a possible segmented area that represents an object and the attached areas as segmented areas that do not represent an object. The same process can be repeated by excluding segmented areas that are already determined as possible segmented areas that represent and do not represent an object. Different parameters related to the degree of attachments, the level of brightness and the area size of a segmented area attached to a brightest segmented area can be used.

Figure 15C:
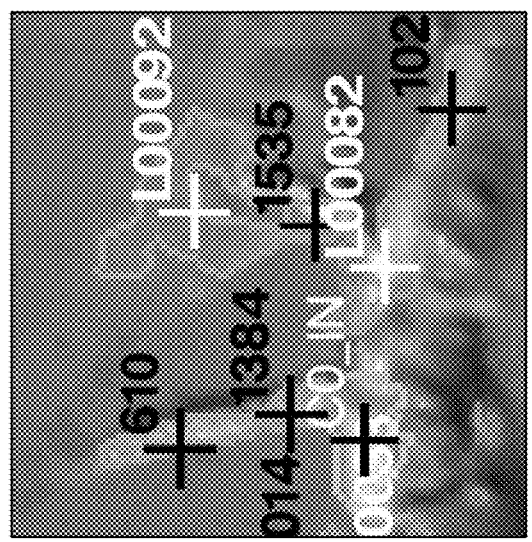
FIGS. 15A-15C are examples of the assignment of numbers to a segmented area to archive data.
Figure 15B:
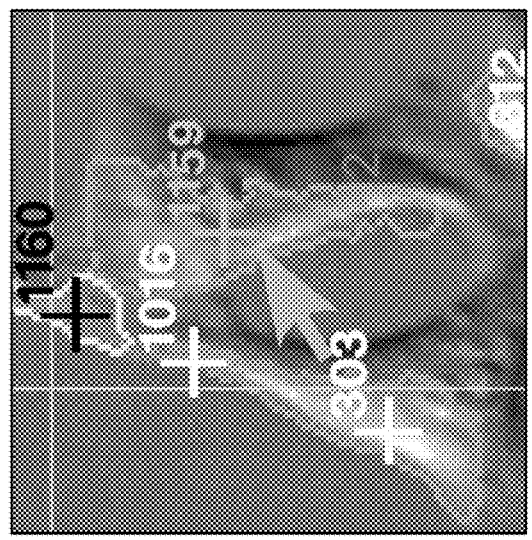
Figure 15A:
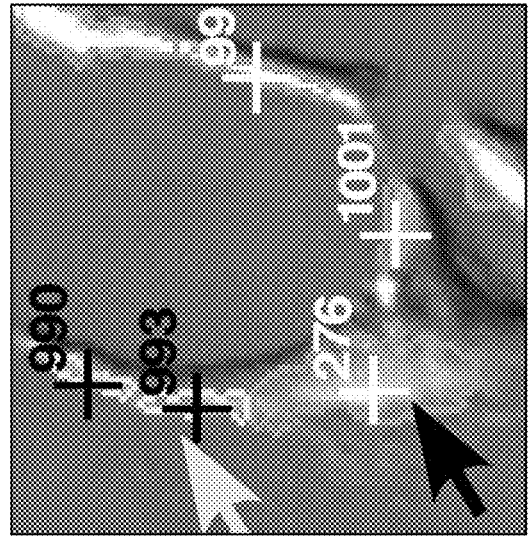

In FIGS. 15A-15C, an example of the identification of a segmented area that represents (black arrow) and does not represent (gray allow) an object is shown. In another embodiment, a segmented area representing an object can be determined using the Interactive mode (1130) by selecting and reshaping an area using the line and circle drawing tools. In FIGS. 15A-15C, an example of an object selected by the interactive mode is shown. In the example, the recorded objects in the image are cells and cell number 0 and a cell lineage number are assigned to a segmented area representing a cell. A temporal object number that is assigned by the Automatic mode (1120) may be verified by evaluating the following 10 images. For example, in the event that a segmented area that is assigned a temporal object number divide into two objects in the following images, an original segmented area may be divided into two area and object numbers may be assigned to each area. In the event that two segmented areas that are assigned a temporal object number are merged into one segmented area in the following images, the original two segmented areas may be merged into one area and one object number may be assigned to the area. Of course, divisions and merging may occur in various patterns. Certain condition, such as no pattern change occurs 5 consecutive images following a division or a merging, may set upon the verification. Once segmented areas representing each cell are annotated, object tracking by segmented area tracking can be performed (1140). Object numbers, such as the cell lineage numbers and cell numbers, can be entered a queue list (1150). Tracking object can be selected from the queue list, displayed the image of the object on a monitor, and tracked the object using the Interactive tracking and event setting tools (1170). Object tracking tools that can redraw shape of segmented areas, and move image forward or backward, can be used to track an object (1180). Events occurred in segmented areas may be marked using the Event setting and cancelation tool (1190). The events may include a change in a shape of the area, an identification of multiple possible tracking targets, an occurrence of merging with a segmented area and another segmented area, and the loss of a segmented. Events occurred in the segmented area may be bipolar cell division, tripolar cell division, tetrapolar cell division, multipolar cell division, cell shape alteration, cell death or cell fusion. The assigned event can be canceled by the Event setting and cancelation tool (1190). Tracking data can be viewed using the Data verification tool (1200) to verify tracking data. The Queue list can be updated following a change made by the Interactive tracking and event setting tools (1170). Automatic area tracking of a segmented area can be performed using the Automatic object tracking (1210). Each segmented area can be tracked by the Object tracking module (270) for 10-20 consecutive time points in images from the segment recorded at the top of the Queue list, and once the last segment recorded in the queue list is processed, the Automatic object tracking (1210) repeats the tracking of a segmented area from the segment recorded at the top of the Queue list until 100-200 time points have been recorded. The Event identification module (280) identifies events occurred in the segmented area that is being tracked. In some instances that automatic tracking for a given segmented area fails, the information for that area is entered into a check list (1160) instead of the queue list (1150). Tracking object is selected from the check list, and tracking data is corrected or verified using the Interactive tracking and event setting tools (1170). The tracking with 100-500 segmented areas that represent a cell at time point 1 is resulting in the tracking of 2,000-10,000 segmented areas due to cell proliferation (4-5 cell doublings) during the observation period. In another example, the automatic tracking processing speed is approximately 0.3 s/time point/segmented area using a computer with a solid-state drive, and automatic tracking of 420 segmented areas representing progenitor cells and segmented areas corresponding to their progeny (11,640 cells) up to time point 693 (6930 min) take around 150 h. In some embodiments, after processing 100-200 time points, the tracking data entered in the queue and check lists are evaluated to determine if these series of data accurately represents cells, using the Interactive tracking and event setting tools (1170). Automatically segmented area tracking accuracy never reaches 100% in practice, the Interactive tracking and event setting tools (1170) are essential to relate the tracking data for segmented areas to individual cells to build an accurate tracking database (290). The tracking data validation (1220) certify the tracking data stored into the Tracking database (290), which contains data regarding time points, object numbers, x and y positions of the objects, types of events that occurred in the objects, sizes, average brightness, and gravity centers of the areas, information on the edge circles, relationships of one object with other object, and area numbers assigned. In the event that the Multichannel mode (140) is used, the Tracking database (290) may also contains fluorescence intensities of the objects and types of a fluorophore. The Tracking database (290) comprises six data arrays, such as arrays holding pixel values and x-y positions of edge circle, a number related to an object and segmented area, statuses of a segmented area, gravity centers and sizes of segmented areas, tracking data that include information related to objects, a relationship between one object and other objects, and maps that indicate pixel positions of segmented areas. The Data verification and repair (1230) can verify data array structures. In the instance that an error is found in an array, the Data verification and repair (1230) can restore the array using data stored in other arrays.

Figure 16:
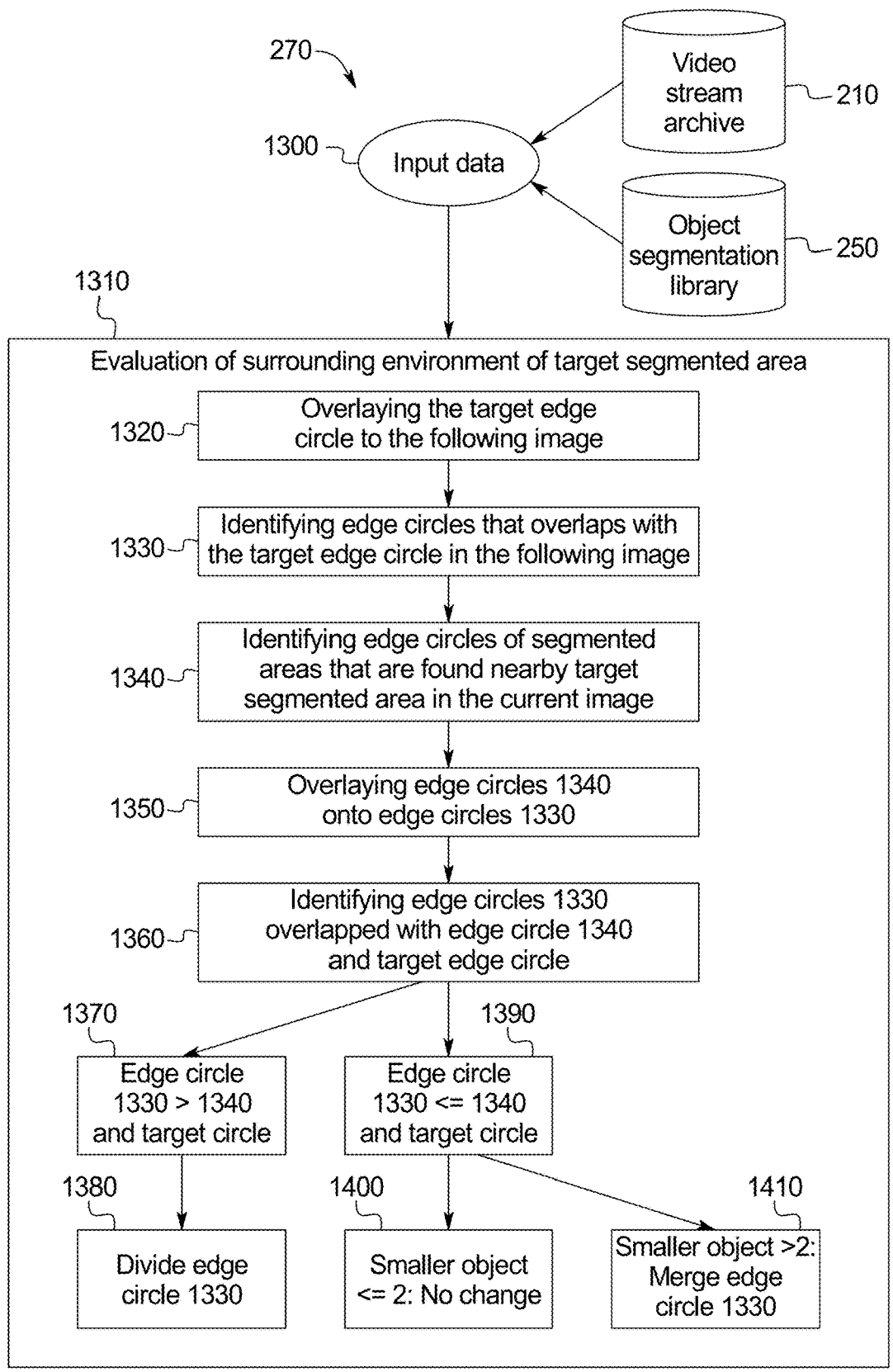
FIG. 16 is a block diagram illustrating the automatic object tracking.

FIG. 16 depicts a flow diagram illustrating an example of the segmented area tracking. An image assembly stored in the Video stream archive (210) and segmented areas data stored in the Object segmentation library (250) can be used as Input data (1300). Segmented area tracking is performed by evaluating segmented areas nearby the target segmented area (1310). FIGS. 17A-17L schematically illustrates the process of segmented area tracking by exemplified the tracking of cells. White number indicates a segmented area that represents a cell in time A (FIG. 17A), and black numbers in the time A and A+1 image indicate unassigned segments (FIGS. 17A and D, respectively). To track a segmented area representing a cell, the unassigned segments are reorganized based on information for the target and surrounding segmented areas from time A by dividing or merging these segments. For example, in the event that cell indicated by the light-dark gray circle is tracked (FIG. 17B), the segment inside the cell (black circle and arrow) is used to represent the cell (FIG. 17C). This segment disappears at time A+1 (FIG. 17E), and new segments (Fig. E, light gray circles 1 and 2) appear in the neighborhood of the target segmented area. Light gray circle 2 partly overlaps with the cell that is being tracked (target cell) (FIG. 17E). Thus, to track the target cell, the segment representing the cell at time A+1 is redefined as follows. First, the black segment for time A is overlaid on the time A+1 image (1320, and FIG. 17F) and the black circle segment is overlapped with the light gray segment (light gray circle 2) (1330, and FIG. 3F). Second, to guide the readjustment of the target segmented area, surrounding information for the target segmented area, such as other neighboring segments (dark gray circles 1 and 2) at time A (1340, and FIG. 17C), is overlaid onto the time A+1 image (1350, FIG. 17G). Then, light gray circles that are overlapped with gray circles and black circle are identified (1360). In the event that a light gray circle is larger than a dark gray circle, the light gray circle is divided (1370). For example, because light gray circle 1 is not attached to the black circle and only overlapped with dark gray circle 1, light gray circle segment 1 is not considered to be part of the target cell, while, since light gray circle 2 overlaps with both dark gray circles 2 and the black circle segment, the light gray circle 2 is divided into two white circles 1 and 2 (1380, and FIG. 17H). The redefined time A+1 segmentation is drawn by combining the black segment at time A with white segment 2 (FIG. 17I) as a segment representing the cell. In the instance that a light gray circle is smaller than dark gray circles and black circle, light gray circles may merge. FIG. 17J shows that the light-dark gray circle represents a cell and black circle is an edge circle for the target segmented area (1390). In the time A+1 image, the area is divided into several small segments (FIG. 17K). In the event that the number of small segments is less than 2, one edge circle segment can be selected as a segmented area that represents a cell (1400). In the instance that more than 3 small edge circles are found, the small edge circle segments are merged to form a single segment (1410, and FIG. 17L), representing a cell. In this embodiment, these processes can be repeated automatically for all cells in the Queue list.

The segmented area tracking can be used for three-dimensional slices of computerized tomography scan (CT) or magnetic resonance imaging. FIGS. 13I-J show an example of a tracking of object visualized by computerized tomography scan of mouse spin. A vertebra visualized in a slice was tracked and the corresponding object in the next slice (FIG. 13I) was identified.

Figure 18:
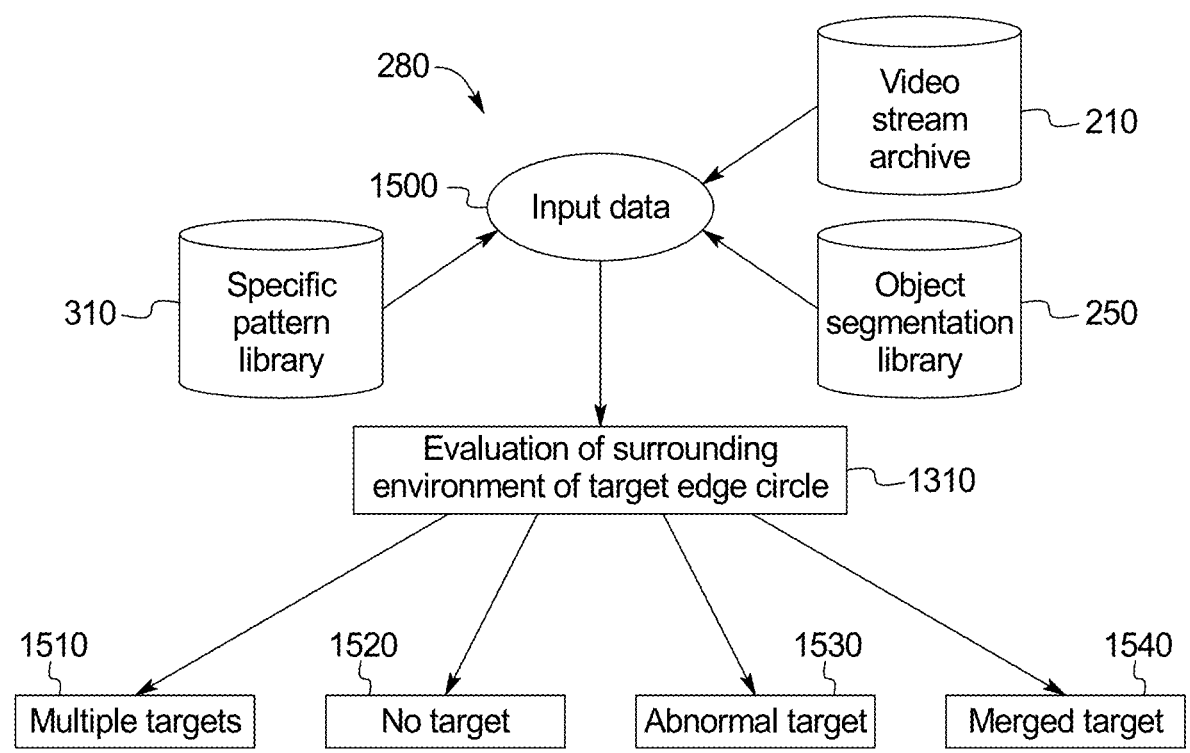
FIG. 18 depicts a flow diagram illustrating an example of the event identification processes.

FIG. 18 depicts a flow diagram illustrating an example of the event identification processes. The specific event can be determined by the location, average pixel value and size of the target areas, and the numbers of target areas, and the specific event include an object movement, an object size change, an object pixel value change, an object division, an object crash, an object lost, an object merge, an object shape alteration, or combinations thereof. In an example, the controller can be configured to correspond the segmented area to an object identification that represents a tracking target segmented area. For example, the controller can be configured to assign a specific biological events and non-biological events to the specific events occurred in the target segments. The Event identification module (280) can use an image assembly stored in the Video stream archive (210), segmented area data stored in the object segmentation library and shapes of an object, such as shapes of mitotic cells saved in the Specific pattern library (310), as Input data (1500). The evaluation of surrounding environment of target segment area (1310) can identify target segment areas. In this instance, a shape of a segmented area can be compared with shapes stored in the Specific pattern library (310) to determine if an event occur in the segment. Such shape comparison can be performed by aligning the gravity center of the shape with that of shapes stored in the Specific pattern library (310), plotting both shapes in a way that the shapes can be fit in a square, e.g. a 100×100 pixels dimension square, calculating a distance of pixel comprising the shapes from the gravity center, determining the differences of the distance between pixels comprising a shape of segmented area determined by (1310) and of a shape stored in the Specific pattern library (310), and obtaining a standard deviation of the differences. In the instance that shapes stored in the Specific pattern library (310) are shapes of mitotic cells, mitotic cells can be identified. In one instance, the identification can be performed in the event that the standard deviation is <0.01. The evaluation of surrounding environment of target segment area (1310) may identify multiple segmented areas (1510). In the instance that cells are tracking objects, the Event identification module (280) may define that bipolar, tripolar, or tetrapolar cell divisions occur in the event that two, three and four segmented areas, respectively, are identified following the detection of mitosis. In this instance, a new number can be assigned for new tracking target areas. In the instance that no target segment area is identified by the Evaluation of surrounding environment of target segment area (1310), the Event identification module (280) may determine that tracking segment is lost (1520). In the instance that cells are tracking objects, the Event identification module (280) may define that cells are lost or moved out from fields of view. In other instances that a target segment area shows less motility compared with other segmented areas, maintains such a situation for more than 500 min, and have higher or lower brightness than other segmented areas, the evaluation of surrounding environment of target segment area (1310) may define the anomaly occurs in the target segment area (1530). In the instance that cells are tracking objects, the Event identification module (280) may define that the anomaly occurs in the target and the anomaly is cell death. In an example that target segment area is attached with another segmented area for certain periods, such as 500 min, the evaluation of surrounding environment of target segment area (1310) may define the target segment area is merged with another area or other segmented areas (1540). In the instance that cells are tracking objects, the Event identification module (280) may define that a cell fusion occurs. In examples wherein the cells are tracking objects, information of such a cell may be entered a check list for data verification. Information of such a cell may be entered a queue list in the event that the event is bipolar cell division. The accuracy of automatic detection of those events may vary depended on cell density and type. For example, mitosis can be automatically detected in cells that form a typical round shape during mitosis, whereas mitosis may be difficult to detect in MiaPaCa2 cells, which do not form a typical round shape during mitosis. In some embodiments, the automatic tracking and event detection error are 1.3 errors per 100 time points per cell, but the error rate may vary depending on the cell type and density.

In an example wherein the tracking objects include clouds, the Event identification module (280) can define that clouds are divided or broken in the event that two, three and four segmented areas, respectively, are identified. In this instance, a new number can be assigned for new tracking target areas. In an example that no target segment area is identified by the Evaluation of surrounding environment of target segment area (1310), the Event identification module (280) may determine that tracking segment is lost or dissolved (1520). In an example wherein the tracking objects include clouds, the Event identification module (280) can define that clouds are generated in the event that a new segment is appeared in the following images. In an example that target segment area is attached with another segmented area for certain periods, such as 10 hr, the evaluation of surrounding environment of target segment area (1310) may define the target segment area is merged with another area or other segmented areas (1540). In an example wherein the tracking objects include clouds, the Event identification module (280) can define that a merging of clouds occurs.

In the example that images generated by computerized tomography scan (CT) or magnetic resonance imaging are used, the Event identification module (280) can define that a brighter object as a specific type of a tissue, e.g. bone or tumor. In an example that target segment area is attached with another segmented area in the following imaging slices, the evaluation of surrounding environment of target segment area (1310) can define the target segment area is merged with other segmented area two or more targets are merged (1540). In the example, the Event identification module (280) can define that a specific type of a tissue is merged with another tissue or other tissues, or a tumor tissue is invaded to another tissue or other tissues.

In an example wherein the tracking objects include birds, the Event identification module (280) can define that birds are flying or resting based on the mobility. In an example that target segment area is attached with another segmented area for certain periods, the evaluation of surrounding environment of target segment area (1310) can define the target segment area is crashed with another area or other segmented areas (1540). In an example wherein the tracking objects include birds, the Event identification module (280) can define that a bird crashes with another birds or other birds.

Figure 19:
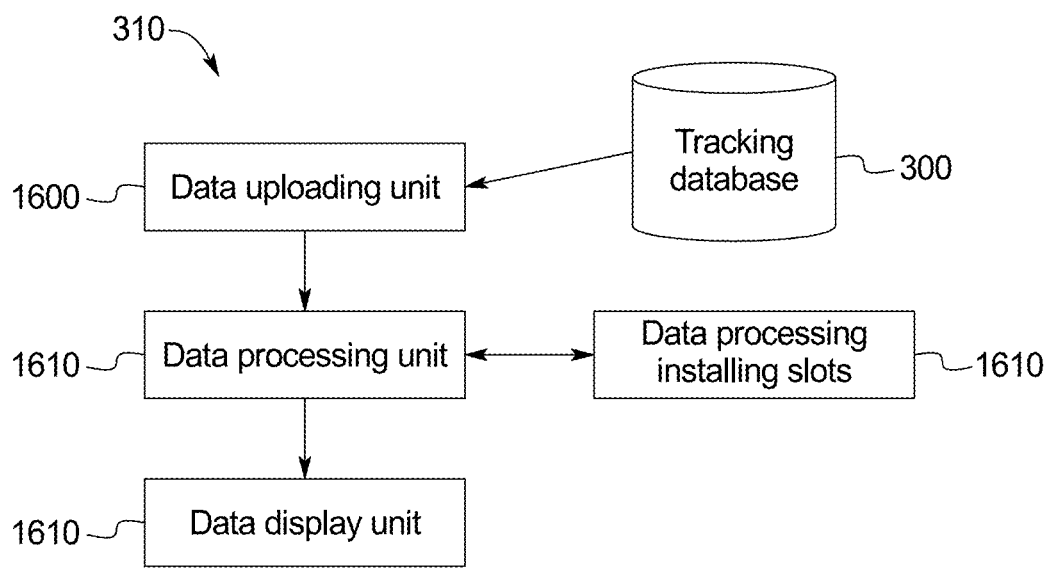
FIG. 19 is a block diagram illustrating the data analysis module.
Figure 22:
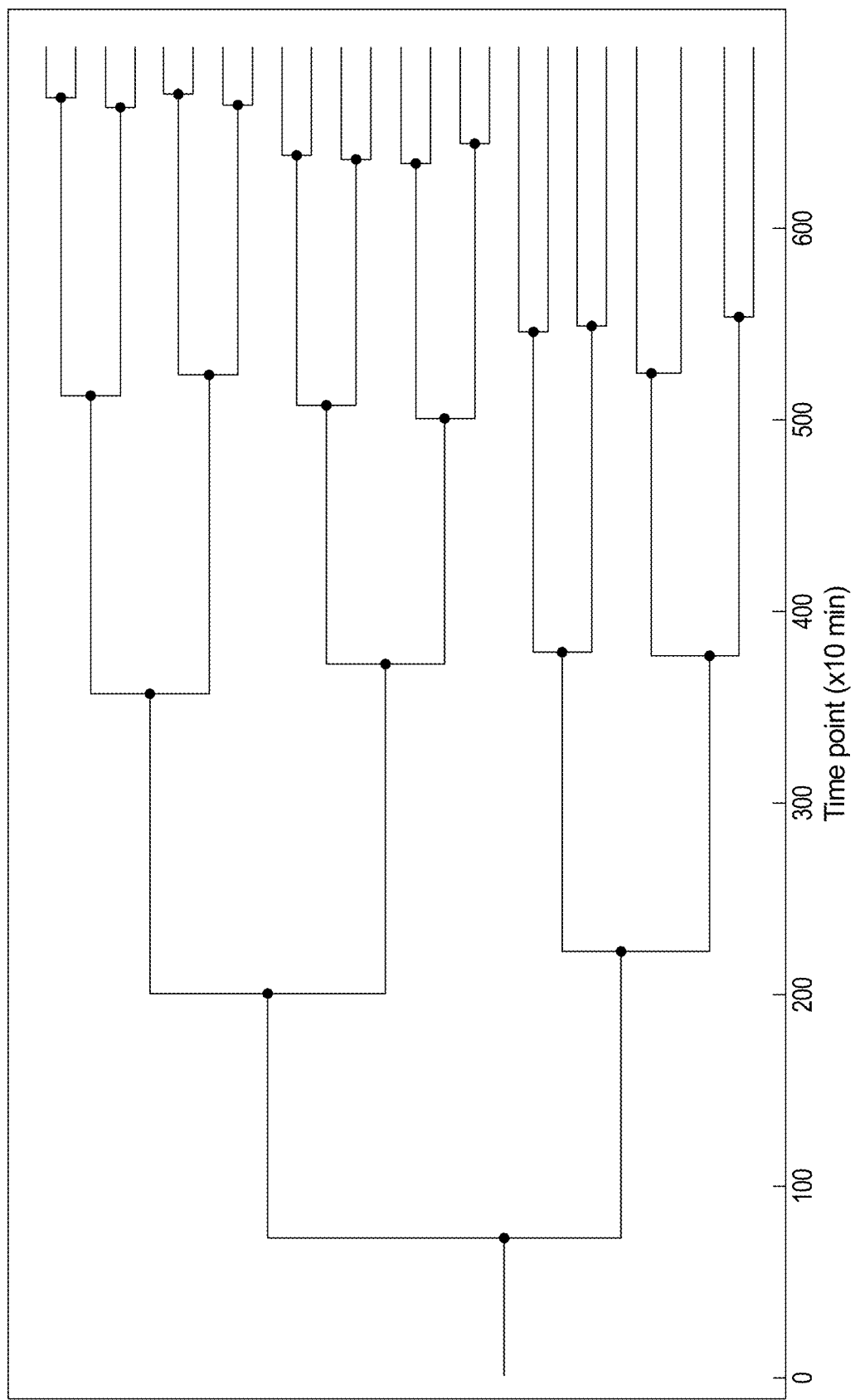
FIG. 22 is an example analysis of cell lineage map.
Figure 23:
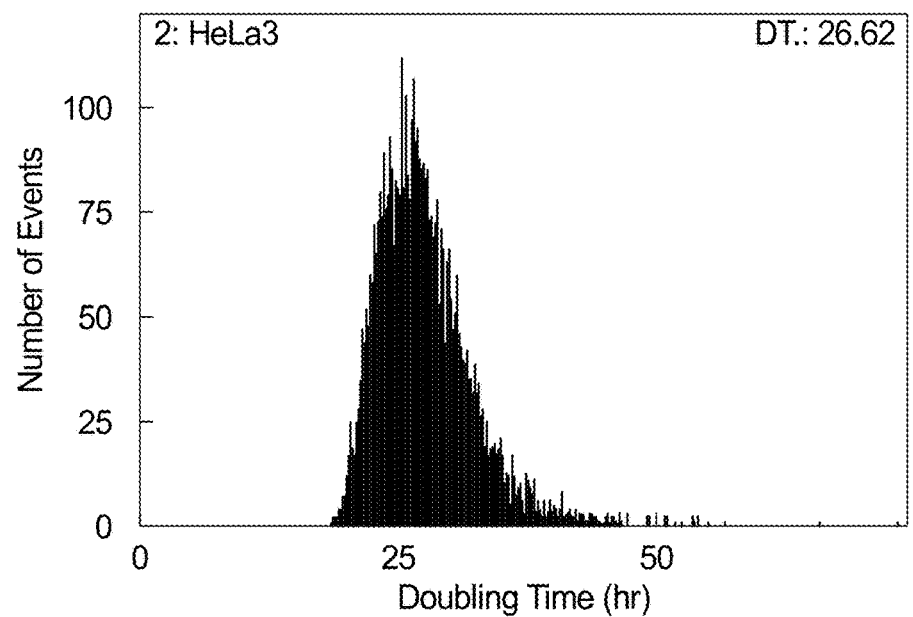
FIG. 23 is an example analysis of cell doubling time.
Figure 24:
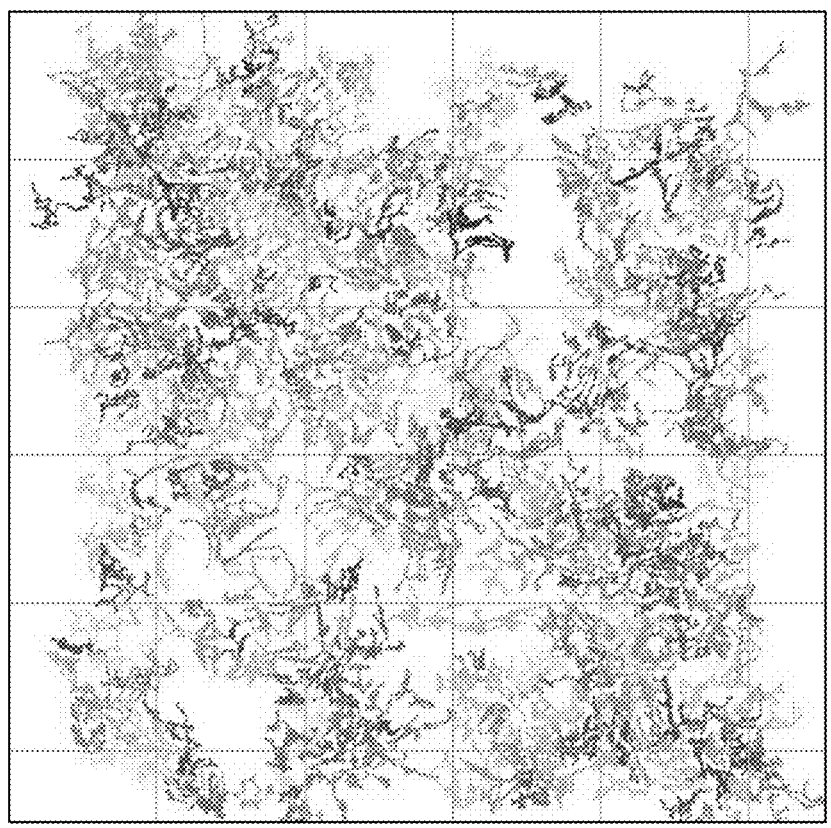
FIG. 24 is an example analysis of cell motility.
Figure 25:
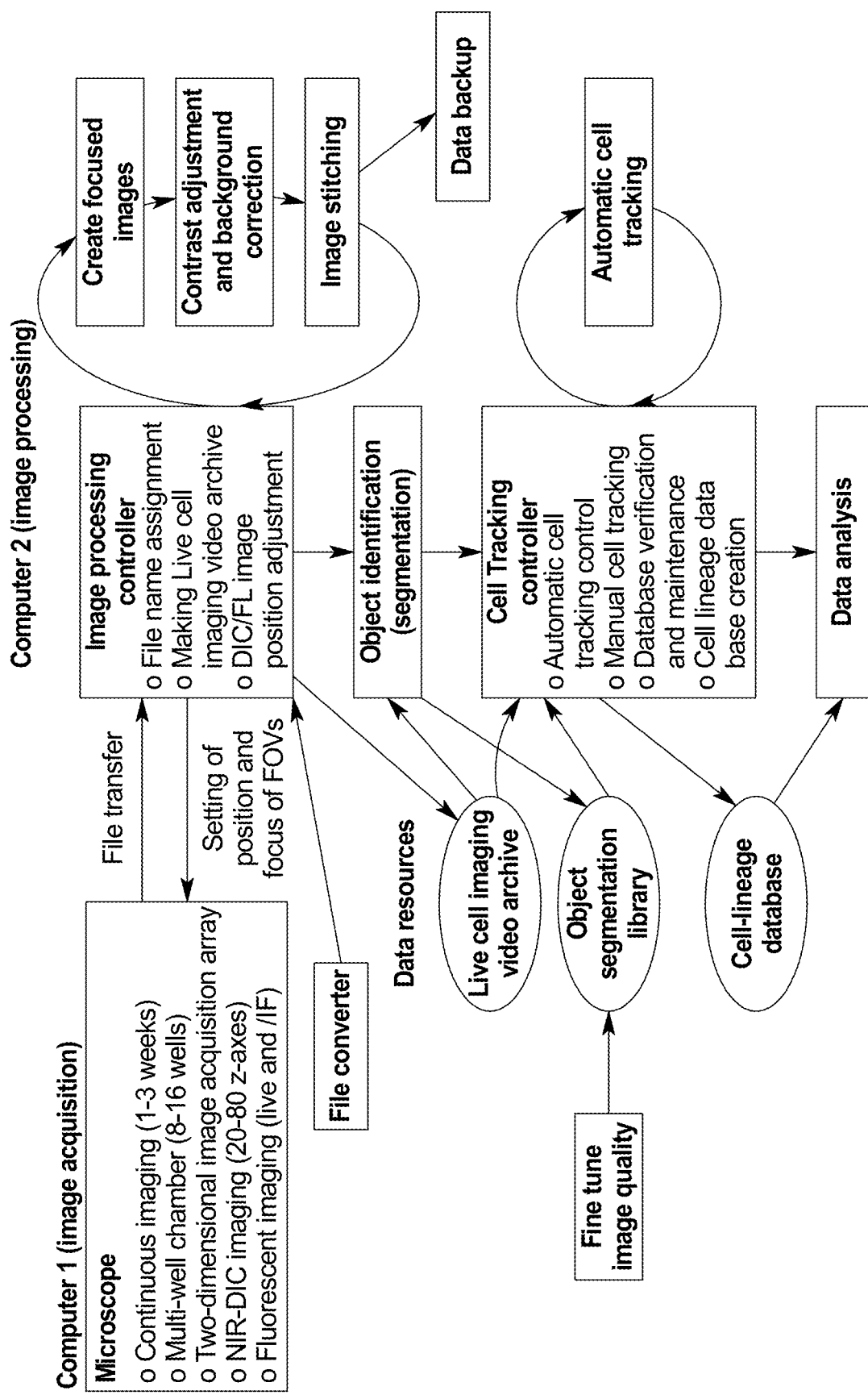
FIG. 25 is a schematic illustration of image segmentation and object tracking system for cells.

FIG. 19 depicts a flow diagram illustrating an example of the Data analysis module. In some embodiments, data stored in the Tracking database (300) can be uploaded to the Data uploading unit (1600). The Data uploading unit (1600) can hold multiple databases simultaneously. Various analyses, including mapping of cell lineage and cell information to a video stream (FIGS. 20A-20B), analysis of cell growth (FIG. 21), cell lineage mapping (FIG. 22), determination of cell division time (FIG. 23), evaluation of motility (FIG. 24), cellular event evaluation and comparison, matching cell lineage information with end-point staining using fluorescence images, analysis of the trajectory of clouds, determination of the size of a tissue visualized by the computerized tomography scan or magnetic resonance imaging, and flying speed of birds can be performed by the Data processing unit (1610) in the event that the database holds tracking data. Various other analyses can be performed by installing a set of executable software instructions to the Data processing installing unit (1610), as the data analysis module can be a platform to allow unlimited types of analyses depending on the requirements. Results of analysis can be displayed on a computer monitor by the Data display unit (1610), printed and exported to a computer hard drive or other storage devices as various formats of file, including but not limited to PDF, tiff, jpeg, text and excel. In FIG. 25, a schematic illustration of image segmentation and object tracking system for cells is shown.

Those skilled in the art will recognize or be able to ascertain using no more than routine experimentation, numerous equivalents to the specific procedures, embodiments, claims, and examples described herein. Such equivalents are considered to be within the scope of this invention and covered by the claims appended hereto.

In an example, the system can include with respect to the first image: extract pixels, perform connectivity analysis to find a first set of segmented areas and a first set of edge pixels surrounding the first set of segmented areas. With respect to the second images: overlay the first set of edge pixel from the first image, expand the pixels outside (A). With respect to the remaining pixels: perform connectivity analysis to find a group of connected pixels, expand the pixels as did for the first image, thereby defining group of pixels (B). As groups A and B are determined independently, there are some overlaps. The system can remove such overlaps, thereby defining the edge pixels that represent the second image. The system can be repeated for a third and fourth image, by repeating the same steps for the second image. The final segmentation areas can be determined after the processing of the at least two images (e.g., 2-6 images).

The difficulty of the segmentation of gray scale images is that when a bright object is located in the vicinity of a dark object, it is getting difficult to find the dark object by existing approach (poor segmentation). In contrast, the present system uses an approach to limit the expansion of edge pixels that are identified in the previous threshold image, and find remaining pixels (darker) using a connectivity analysis.

The system can include threshold images including a plurality of images extracted by a plurality of the predefined threshold pixel value of the original image; wherein a plurality of threshold pixel values is less than the second threshold pixel value to generate a threshold images, wherein the system includes overlaying the set of edge pixels surrounding the connected area that are extracted by higher threshold pixel value onto extracted image extracted by lower threshold pixel value; expanding the overlaid set of edge pixels surrounding the connected area that are extracted by higher threshold pixel value with the set of pixels that are extracted by lower threshold pixel value, wherein the expansion of edge pixels to a plurality of pixels outside of the edge pixels to determine a set of edge pixels surrounding the expanded area; performing a connectivity analysis on the extracted pixels that are extracted by lower threshold pixel value except the pixels surrounded by the overlaid edge pixels; removing overlapped areas of the set of edge pixels surrounding the connected area and the set of edge pixels surrounding the expanded area; and identifying a set of segmented areas and edge pixels surrounding the segmented areas.

In an example, the controller can be configured to track the segmented area by overlaying segment areas including target segment area and other areas in the current time frame or current slice in the three dimensional slices with the segmented areas in the following frame; an overlapped area in the following frame when the size of the segmented area in the following frame is larger than an area size of the current frame, and an average pixel value of a segmented area in the following frame is larger or smaller than a predetermined range of pixel value of an area of current frame; overlapped areas in the following frame when the size of segmented areas in the following frame are smaller than an area size of the current frame, and an average pixel value of segmented areas in the following frame are within a predetermined range of pixel value of an area of current frame, or combinations thereof.

In an example, the controller can be configured to track the segmented area by identifying a segmented area that is being tracked (target segmented area) or areas from dividing and/or merging segment in the following time frame when the overlapped area size of the current segmented area with divided and/or merged area is within a predetermined range of the overlapped area size and an average pixel value of the current segmented area is within a predetermined range of pixel value of divided and/or merged area.

The controller can be configured to track the segmented area by analyzing size and pixel value of identified target area or areas from consecutive images that follow current image; and determining identified target area or areas when the size and pixel value are within a predetermined range of size and pixel value. In an example, the controller can be configured to track the segmented area from the next image of the image that include the last identified target segmented area.

The specific event can be determine by the location, average pixel value and size of the target areas, and the numbers of target areas, and the specific event include an object movement, an object size change, an object pixel value change, an object division, an object crash, an object lost, an object merge, an object shape alteration, or combinations thereof.

In an example, the controller can be configured to correspond the segmented area to an object identification that represents a tracking target segmented area. For example, the controller is configured to assign a specific biological events and non-biological events to the specific events occurred in the target segments.

In an example, the specific biologicals event can include a cell movement, a bipolar cell division, tripolar cell division, tetrapolar cell division, multipolar cell division, cell death, cell shape alteration, cell fusion, or combination thereof. The system can be used to track a location of tumor size of tumor, or combination thereof, in a three-dimensional MRI image. The system can be used to track a movement of cloud, a merging cloud, a diminishing cloud, a generation of cloud, or combination thereof; and a movement of animals including bird and fish, a clash of animals including bird and fish, or combination thereof.

In an example, the controller can be configured to assign a cell lineage number that represents the segmented area corresponding to a group of cells derived from the same progenitor; an identification number to a tumor; a cloud number; an animal number; or combinations thereof.

As mentioned above, aspects of the systems and methods described herein are controlled by one or more controllers. The one or more controllers may be adapted to run a variety of application programs, access and store data, including accessing and storing data in the associated databases, and enable one or more interactions as described herein. Typically, the controller is implemented by one or more programmable data processing devices. The hardware elements, operating systems, and programming languages of such devices are conventional in nature, and it is presumed that those skilled in the art are adequately familiar therewith.

For example, the one or more controllers may be a PC based implementation of a central control processing system utilizing a central processing unit (CPU), memory and an interconnect bus. The CPU may contain a single microprocessor, or it may contain a plurality of microprocessors for configuring the CPU as a multi-processor system. The memory may include a main memory, such as a dynamic random access memory (DRAM) and cache, as well as a read only memory, such as a PROM, EPROM, FLASH-EPROM, or the like. The system may also include any form of volatile or non-volatile memory. In operation, the memory stores at least portions of instructions for execution by the CPU and data for processing in accord with the executed instructions.

The one or more controllers may also include one or more input/output interfaces for communications with one or more processing systems. Although not shown, one or more such interfaces may enable communications via a network, e.g., to enable sending and receiving instructions electronically. The communication links may be wired or wireless.

The one or more controllers may further include appropriate input/output ports for interconnection with one or more output mechanisms (e.g., monitors, printers, touchscreens, motion-sensing input devices, etc.) and one or more input mechanisms (e.g., keyboards, mice, voice, touchscreens, bioelectric devices, magnetic readers, RFID readers, barcode readers, motion-sensing input devices, etc.) serving as one or more user interfaces for the controller. For example, the one or more controllers may include a graphics subsystem to drive the output mechanism. The links of the peripherals to the system may be wired connections or use wireless communications.

Although summarized above as a PC-type implementation, those skilled in the art will recognize that the one or more controllers also encompasses systems such as host computers, servers, workstations, network terminals, and the like. Further one or more controllers may be embodied in a device, such as a mobile electronic device, like a smartphone or tablet computer. In fact, the use of the term controller is intended to represent a broad category of components that are well known in the art.

Hence aspects of the systems and methods provided herein encompass hardware and software for controlling the relevant functions. Software may take the form of code or executable instructions for causing a controller or other programmable equipment to perform the relevant steps, where the code or instructions are carried by or otherwise embodied in a medium readable by the controller or other machine. Instructions or code for implementing such operations may be in the form of computer instruction in any form (e.g., source code, object code, interpreted code, etc.) stored in or carried by any tangible readable medium.

As used herein, terms such as computer or machine "readable medium" refer to any medium that participates in providing instructions to a processor for execution. Such a medium may take many forms. Non-volatile storage media include, for example, optical or magnetic disks, such as any of the storage devices in any computer(s) shown in the drawings. Volatile storage media include dynamic memory, such as the memory of such a computer platform. Common forms of computer-readable media therefore include for example: a floppy disk, a flexible disk, hard disk, magnetic tape, any other magnetic medium, a CD-ROM, DVD, any other optical medium, punch cards paper tape, any other physical medium with patterns of holes, a RAM, a PROM and EPROM, a FLASH-EPROM, any other memory chip or cartridge, or any other medium from which a controller can read programming code and/or data. Many of these forms of computer readable media may be involved in carrying one or more sequences of one or more instructions to a processor for execution.

It should be noted that various changes and modifications to the embodiments described herein will be apparent to those skilled in the art. Such changes and modifications may be made without departing from the spirit and scope of the present invention and without diminishing its attendant advantages. For example, various embodiments of the systems and methods may be provided based on various combinations of the features and functions from the subject matter provided herein.

We claim:

1. A system for segmentation of a gray scale video stream, comprising:
    a controller;
    a memory coupled to the controller, wherein the memory is configured to store program instructions executable by the controller;
    wherein in response to executing the program instructions, the controller is configured to:
        receive an original image, wherein the original image is associated with a predefined first threshold pixel value and a predefined second threshold pixel value;
        extract a first set of pixels that are greater than the predefined first threshold pixel value of the original image;
        perform a first connectivity analysis based on the extracted first set of pixels, wherein the connectivity analysis includes identifying a first connected area within which every pixel is greater than the predefined first threshold value and a first set of edge pixels surrounding the first connected area such that every pixel in the first set of edge pixels is greater than the predefined first threshold value;
        extract a second set of pixels that are greater than the predefined second threshold pixel value of the original image, wherein the second threshold pixel value is less than the first threshold pixel value;
        overlay the first set of edge pixels surrounding the first connected area onto the extracted second set of pixels;
        when the extracted second set of pixels are immediately adjacent to the first set of edge pixels, expand the overlaid first set of edge pixels surrounding the first connected area to the outermost continuously adjacent pixel in the second set of pixels that are greater than the predefined second threshold pixel value of the original image, wherein the expansion determines a second set of edge pixels surrounding the expanded area;
        perform a second connectivity analysis on the extracted second set of pixels excluding all areas within boundaries of the first set of edge pixels, wherein the connectivity analysis includes identifying a second connected area;
        remove overlapped areas of the set of edge pixels surrounding the second connected area and the set of edge pixels surrounding the expanded area, wherein the removal includes identifying a third set of edge pixels surrounding areas to determine a segmented area;
        determine a specific event that occurred in the segmented area; and
        display the specific event on a user interface.

2. The system of claim 1, wherein the first connectivity analysis includes
    expanding a plurality of lines from the first set of edge pixels surrounding the first connected area, wherein the lines extend away from the first set of edge pixels until an end of the line corresponds to a pixel value greater than a predetermined first expansion pixel value, and
    connecting the end of extended lines to define a first boundary of a first segmentation for the first threshold image.

3. The system of claim 2, wherein the first segmentation is associated with a first object in the original image.

4. The system of claim 1, wherein the second connectivity analysis includes
    expanding a plurality of lines from the second set of edge pixels surrounding the second connected area, wherein the lines extend away from the second set of edge pixels until an end of the line corresponds to a pixel value greater than a predetermined second expansion pixel value, and
    connecting the end of extended lines to define a second boundary of a second segmentation for the second threshold image.

5. The system of claim 4, wherein the second segmentation is associated with a second object in the original image.

6. The system of claim 1, wherein the specific event includes a cell lineage number, bipolar cell division, tripolar cell division, tetrapolar cell division, multipolar cell division, cell death, cell shape alteration, cell fusion, or combination thereof.

7. The system of claim 1, wherein the specific event includes an object division, an object fusion, an object shape alteration, or combinations thereof.

8. The system of claim 1, wherein the controller is configured to correspond the segmented area to an object identification that represents a tracking target segmented area.

9. The system of claim 1, wherein the controller is configured to assign a cell lineage number that represents the segmented area corresponding to a group of cells derived from the same progenitor.

10. The system of claim 1, wherein the controller is configured to assign an object identification that represents the segmented area corresponding to a group of objects derived from the same object.

11. The system of claim 1, wherein the controller is configured to evaluate an area size of the segmented area, a brightness of the segmented area, the degree of attachment of the segmented area with other segmented area, or combinations thereof.

12. The system of claim 1, wherein the controller is configured to store information related to the segment area into a database.

13. The system of claim 1, wherein the controller is configured to track the segmented area during a time frame included in a video stream by merging segmented areas, dividing segmented areas, or combinations thereof.

14. The system of claim 1, wherein the controller is configured to track the segmented area by overlaying at least one segment area including the target area in a first time frame with the segmented area in a subsequent time frame from the first time frame.

15. A system for segmentation of a gray scale video stream, comprising:
 a controller;
 a memory coupled to the controller, wherein the memory is configured to store program instructions executable by the controller;
 wherein in response to executing the program instructions, the controller is configured to:
  receive an original image, wherein the original image is associated with a predefined first threshold pixel value and a predefined second threshold pixel value;
  extract a first set of pixels that are greater than the predefined first threshold pixel value of the original image;
  perform a first connectivity analysis based on the extracted first set of pixels, wherein the connectivity analysis includes identifying a first connected area and a first set of edge pixels surrounding the first connected area;
  extract a second set of pixels that are greater than the predefined second threshold pixel value of the original image, wherein the second threshold pixel value is less than the first threshold pixel value;
  overlay the first set of edge pixels surrounding the first connected area onto the extracted second set of pixels;
  expand the overlaid first set of edge pixels surrounding the first connected area with the second set of pixels that are greater than the predefined second threshold pixel value of the original image, wherein the expansion determines a second set of edge pixels surrounding the expanded area;
  perform a second connectivity analysis on the extracted second set of pixels excluding all areas within boundaries of the first set of edge pixels, wherein the connectivity analysis includes identifying a second connected area and a second set of edge pixels surrounding the second connected area;
  remove overlapped areas of the set of edge pixels surrounding the second connected area and the set of edge pixels surrounding the expanded area, wherein the removal includes identifying a third set of edge pixels surrounding areas to determine a segmented area;
  determine a specific event that occurred in the segmented area; and
  display the specific event on a user interface;
 wherein the controller is configured to track the segmented area by overlaying at least one segment area including the target area in a first time frame with the segmented area in a subsequent time frame from the first time frame;
 wherein when the size of the segmented area in the subsequent time frame is larger than an area size in the first current frame, an average pixel value of a segmented area in the subsequent time frame is within a predetermined range of a pixel value of a segmented area of the first time frame.

16. A system for segmentation of a gray scale video stream, comprising:
 a controller;
 a memory coupled to the controller, wherein the memory is configured to store program instructions executable by the controller;
 wherein in response to executing the program instructions, the controller is configured to:
  receive an original image, wherein the original image is associated with a predefined first threshold pixel value and a predefined second threshold pixel value;
  extract a first set of pixels that are greater than the predefined first threshold pixel value of the original image;
  perform a first connectivity analysis based on the extracted first set of pixels, wherein the connectivity analysis includes identifying a first connected area and a first set of edge pixels surrounding the first connected area;
  extract a second set of pixels that are greater than the predefined second threshold pixel value of the original image, wherein the second threshold pixel value is less than the first threshold pixel value;
  overlay the first set of edge pixels surrounding the first connected area onto the extracted second set of pixels;
  expand the overlaid first set of edge pixels surrounding the first connected area with the second set of pixels that are greater than the predefined second threshold pixel value of the original image, wherein the expansion determines a second set of edge pixels surrounding the expanded area;
  perform a second connectivity analysis on the extracted second set of pixels excluding all areas within boundaries of the first set of edge pixels, wherein the connectivity analysis includes identifying a second connected area and a second set of edge pixels surrounding the second connected area;
  remove overlapped areas of the set of edge pixels surrounding the second connected area and the set of edge pixels surrounding the expanded area, wherein the removal includes identifying a third set of edge pixels surrounding areas to determine a segmented area;
  determine a specific event that occurred in the segmented area; and
  display the specific event on a user interface;
 wherein the controller is configured to track the segmented area by overlaying at least one segment area including the target area in a first time frame with the segmented area in a subsequent time frame from the first time frame;
 wherein when the size of segmented areas in the subsequent time frame is smaller than an area size of the current time frame, an average pixel value of segmented areas in the following frame are within a predetermined range of pixel value of an area of current frame.

* * * * *